United States Patent
Mishra et al.

(10) Patent No.: US 10,424,001 B1
(45) Date of Patent: Sep. 24, 2019

(54) TACTILE AND VISUAL FEEDBACK FOR ELECTRONIC SHOPPING

(71) Applicant: Amazon Technologies, Inc., Seattle, WA (US)

(72) Inventors: Pragyana K. Mishra, Seattle, WA (US); Dushyant Goyal, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 543 days.

(21) Appl. No.: 15/190,042

(22) Filed: Jun. 22, 2016

(51) Int. Cl.
| | |
|---|---|
| G06Q 30/00 | (2012.01) |
| G06Q 30/06 | (2012.01) |
| B33Y 50/00 | (2015.01) |
| B33Y 80/00 | (2015.01) |

(52) U.S. Cl.
CPC .......... *G06Q 30/0627* (2013.01); *B33Y 50/00* (2014.12); *B33Y 80/00* (2014.12); *G06Q 30/0623* (2013.01); *G06Q 30/0625* (2013.01); *G06Q 30/0643* (2013.01)

(58) Field of Classification Search
CPC ........... G06Q 30/0623; G06Q 30/0625; G06Q 30/0627; B33Y 50/00; B33Y 80/00
See application file for complete search history.

(56) References Cited

U.S. PATENT DOCUMENTS

| | | | | |
|---|---|---|---|---|
| 9,346,219 | B2* | 5/2016 | Taylor | B33Y 50/00 |
| 9,437,119 | B1* | 9/2016 | Bernal | G09B 23/34 |
| 9,827,714 | B1* | 11/2017 | Ruxton | G06Q 30/0621 |
| 2011/0298897 | A1* | 12/2011 | Sareen | G06N 3/006 348/47 |
| 2014/0129354 | A1* | 5/2014 | Soon-Shiong | G06Q 30/06 705/16 |
| 2014/0316546 | A1* | 10/2014 | Walsh | G06F 17/50 700/98 |
| 2015/0102526 | A1* | 4/2015 | Ward | D21F 1/0027 264/308 |
| 2015/0250420 | A1* | 9/2015 | Longinotti-Buitoni | A61B 5/6804 600/301 |
| 2015/0269282 | A1* | 9/2015 | Nelaturi | G06F 17/50 700/98 |

OTHER PUBLICATIONS

"Recent Developments in 3D printable composite materials," by Umme Kalsoom, Pavel N. Nesterenko, and Brett Paull, RSC Adv., 2016, 6, 60355 (Year: 2016).*

"Stores of the future," by Barbara Thau, Chain Store Age 89.7: 12(4). Lebhar-Freidman, Inc. (Nov. 2013) (Year: 2013).*

* cited by examiner

*Primary Examiner* — Anne M Georgalas
(74) *Attorney, Agent, or Firm* — Athorus, PLLC

(57) ABSTRACT

A customer who visits an online marketplace to view information regarding an item formed from fabric may request and receive instructions for producing a sample of the fabric that mimics the sensations of touch and feel of the fabric. The sample may be produced using an automated fabricator, such as a 3D printer, associated with a client device from which the customer made the request. The instructions may include or describe a digital model of the fabric, customized for the automated fabricator. In particular, the sample may be formed from various plastics or other materials that are accessible to the automated fabricator, and need not be formed from the actual materials that are included in the fabric.

20 Claims, 15 Drawing Sheets

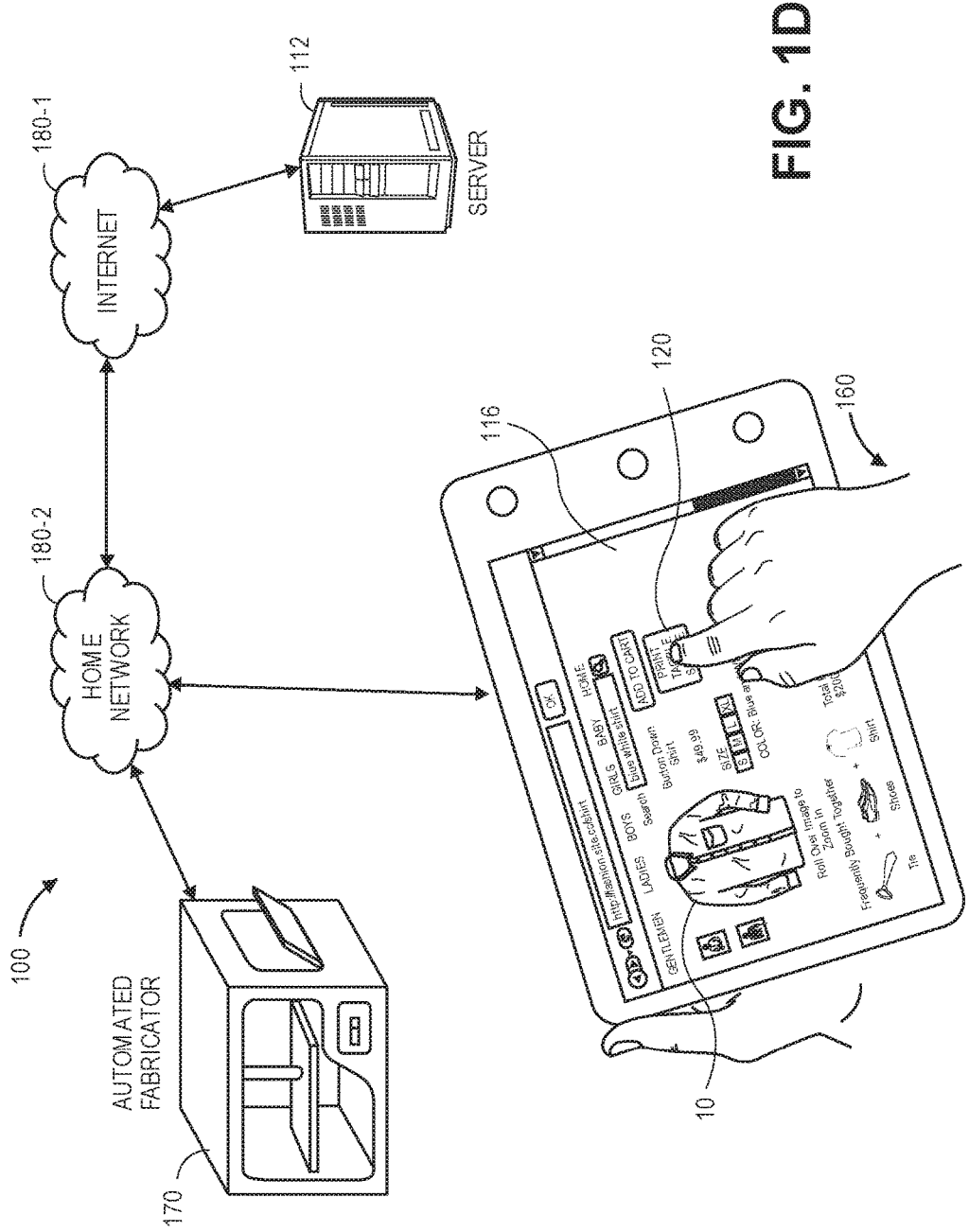

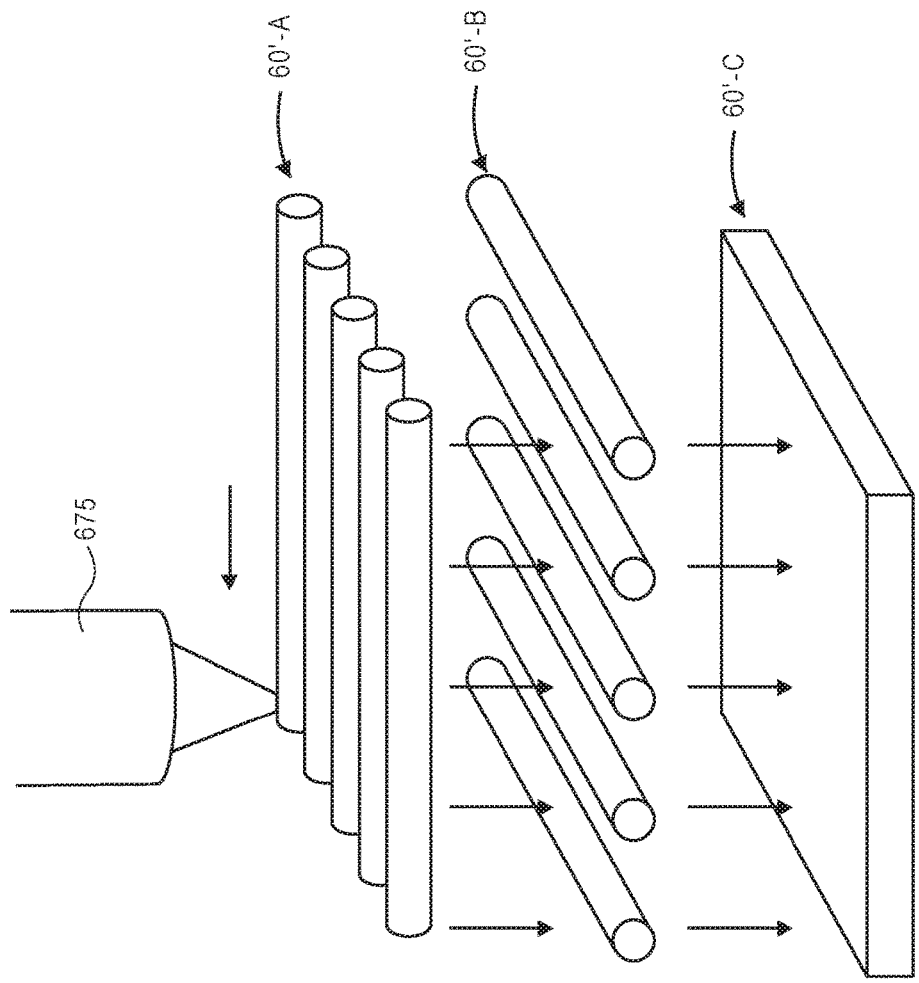

TACTILE AND VISUAL FEEDBACK FOR ELECTRONIC SHOPPING

BACKGROUND

Online marketplaces enable customers to search for or browse information regarding items that are available for purchase from a variety of sources and in a variety of ways through one or more network pages or sites. For example, an online marketplace may offer items for sale that it owns and controls, as well as items that are owned by sellers, via one or more web pages or web sites. Online marketplaces typically provide information regarding such items, regardless of their source, to customers via network pages or sites that are accessible to networked computing devices of any type or form.

Improvements to Internet programming and network connectivity have greatly enhanced the breadth and quality of information that an online marketplace may provide to customers regarding its product offerings. Originally, online marketplaces merely hosted pages that displayed names of items that were available for purchase, along with brief descriptions of such items, or single, static images of such items. Today, however, online marketplaces are able to host dynamic pages that feature a wide variety of information regarding available items, including in-depth descriptions, specifications, details, instructions for assembly or use, rankings or feedback from other customers, as well as any number of still or moving images depicting views of such items, or showing the items in their intended uses. Such pages also enable customers to interact with the online marketplace regarding an item, or with one or more manufacturers, merchants, sellers or vendors of the item, as well as customers who have previously purchased the item, directly through such pages or, alternatively, via one or more social networks.

Despite advancements in Internet technology and the maturity of their network pages and sites, online marketplaces are limited in their ability to fully and accurately describe available items to customers, particularly for items of apparel. Although volumes of information regarding an item that may be provided to customers via a network page or site are theoretically unbounded, online marketplaces are currently unable to present any information other than that which may be seen (e.g., text or imagery) or heard (e.g., music or other sounds). Presently, online marketplaces cannot provide any information that might be perceived by three of the five senses, viz., the senses of touch, taste or smell.

This deficiency is particularly problematic when an online marketplace offers for sale one or more items of apparel, which naturally come into contact with portions of the human body during use. Unlike brick-and-mortar stores, online marketplaces are currently unable to permit customers to "try on" items prior to purchasing them, in order to determine which variation or model of a particular item or product feels best to the individual customer. Instead, customers may merely view pictures or video, or read product details or comments from other customers, regarding items of apparel such as belts, gloves, hats, pants, shirts, shorts, socks, shoes or underwear before selecting and purchasing one or more of such items. Similarly, customers are also unable to feel other commercial items such as carpets, mats, pillows, rugs, seat cushions, tiles, towels or other items that are also specifically designed to come into contact with skin during use.

The inability to try on a particular article of clothing, or to otherwise experiment with an item prior to purchasing it, places online marketplaces at a disadvantage to their brick-and-mortar counterparts. Although articles of clothing or other items that are intended to be touched by users may be characterized with words describing contents of such articles or items (e.g., canvas, cashmere or cotton, or fur, flannel or fleece), or their methods of manufacture (e.g., cross-stitched, stone-washed, screen-printed), or even the way that such articles or items feel (e.g., soft, smooth, rough), customers are unable to touch and feel an article or an item, or to visibly examine the article or the item, unless and until the article or the item is ordered and received.

To overcome inefficiencies and uncertainty associated with the purchase of items from online marketplaces, many customers may choose to order multiple variations or models of items from an online marketplace, even though they intend to keep and use just one of the variations, and to return the other items to the online marketplace after they have chosen a variation or model that subjectively feels the best. Such a scenario may create challenges for the online marketplace, which must deliver multiple variations or models of a specific class or type of item, and then return all but one of the variations or models to stock while only receiving payment for one of the variations or models. Moreover, this scenario may result in a fluctuating account of available inventory that may be provided to other customers. Although some online marketplaces or Internet-based marketplaces or vendors enable customers to request and receive samples of items by mail, thereby enabling a customer to touch and feel or look at such samples prior to making a purchase, such policies are inherently limited in that such marketplaces or vendors are required to obtain and maintain material samples in stock, and to deliver such samples to customers. Such policies also require a marketplace or vendor to manufacture and store an unusable quantity of a material, in an unusual shape, and absorb the cost of shipping the material to a customer, without any guarantee that a profit will be gained as a result of such efforts.

BRIEF DESCRIPTION OF THE DRAWINGS

FIGS. 1A through 1F are views of aspects of one system for providing tactile or visual feedback in accordance with embodiments of the present disclosure.

FIGS. 6A through 6C are views of aspects of one system for providing tactile or visual feedback in accordance with embodiments of the present disclosure.

DETAILED DESCRIPTION

Figure 1A:
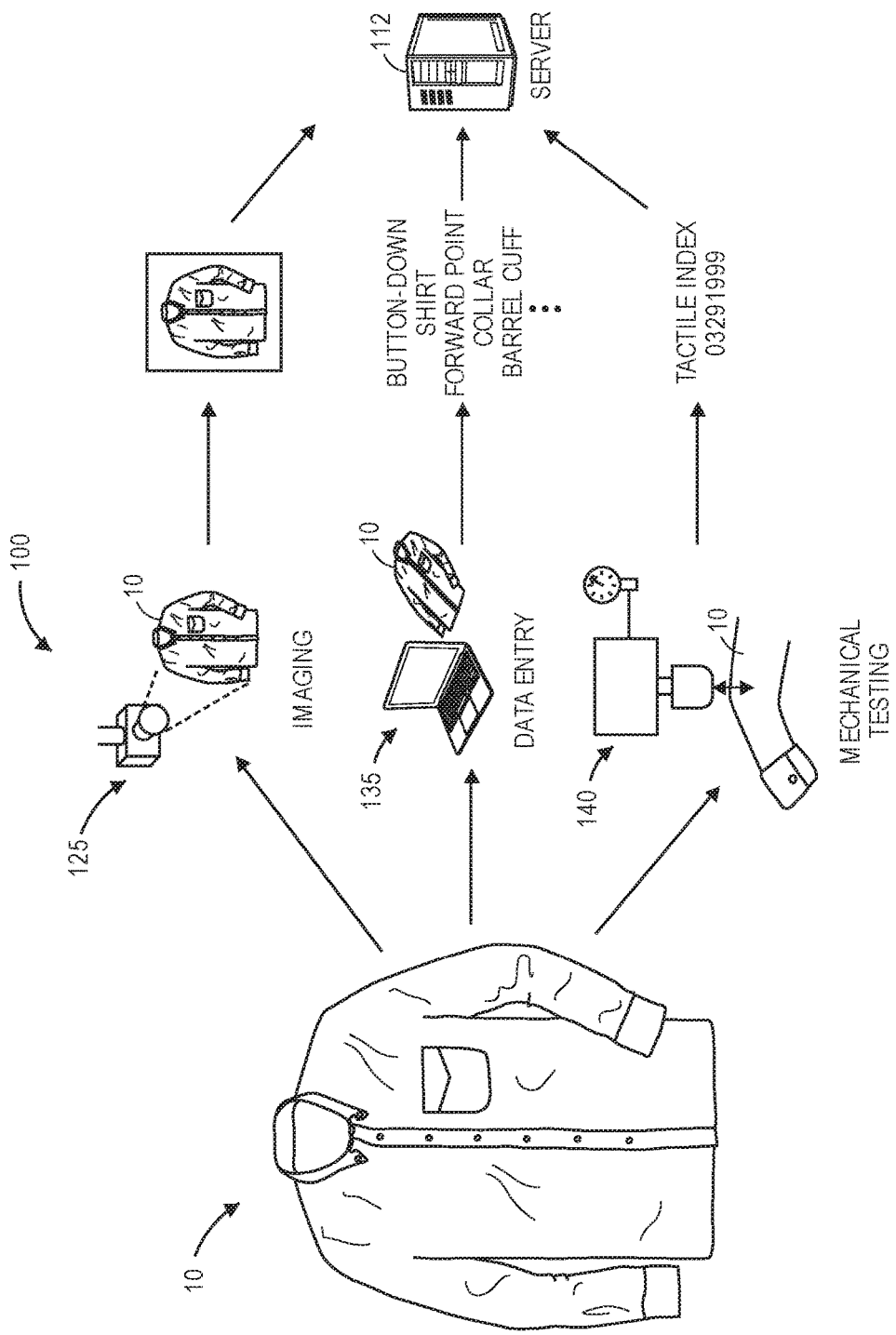

As is set forth in greater detail below, the present disclosure is directed to generating tactile samples of items that are offered for sale in electronic commerce. More specifically, the systems and methods of the present disclosure are directed to defining digital characteristics or models of the touch and feel of consumer items that are intended to come into contact with human skin during use, including but not limited to articles of apparel, or the look of such items. The digital characteristics or models may be hosted on one or more network pages or sites maintained by server-side computer devices associated with online marketplaces, or otherwise made accessible to users of client-side programs such as browsers or other applications. A customer who visits a network page or site associated with an item may request and download production information regarding the item, e.g., digital characteristics of an item, a digital model of the item, or instructions for generating a sample of the item, to his or her client device, or to an automated fabricator, such as a 3D printer, associated with the client device. Subsequently, the automated fabricator may interpret the production information and generate a sample of the item from stock materials (e.g., various types of plastics, ceramics or metals) that are accessible to the automated fabricator. The sample of the item may be specifically designed and fabricated in order to mimic the similar response of the actual item when touched or felt by a customer.

Referring to FIGS. 1A through 1F, views of aspects of one system 100 for providing tactile or visual feedback in accordance with embodiments of the present disclosure are shown. The system includes an item 10, a server 112, an imaging device 125, a client device 135 and a testing facility 140, a client device 162 (viz., a tablet computer) and an automated fabricator 170 (e.g., a 3D printer).

As is shown in FIG. 1A, when an item 10 (viz., a collared shirt) is offered for sale at an online marketplace, the item 10 may be subjected to a number of inbound processing evolutions that may be performed either simultaneously, in series or in parallel. First, the item 10 may be photographed from a number of angles or perspectives, either independently or in use (e.g., while being worn by a user), using the imaging device 125. Next, information or data regarding the item 10 may be determined, using the client device 135. For example, an identifier of a source of the item 10 (e.g., a specific manufacturer, merchant, seller or vendor of the item 10, or a nation or other geographic location from which the item originated), one or more details or specifications of the item 10 (e.g., ingredients, operational ratings, instructions or text-based descriptions of the item 10), rankings or comments by customers who previously purchased the item 10, or any other relevant information regarding the item 10 may be manually entered into a computer device or automatically obtained from one or more local or remote servers.

Additionally, a number of mechanical testing evolutions directed toward determining any number of measures, metrics, information or other data regarding the tactile feel of the item 10 may be performed in a materials sampling facility 140. For example, the item 10 may be subjected to bending, tensile stresses, surface contact, shear or compression in a controlled environment, in order to learn more about the item 10 and the materials from which the item 10 was formed. Alternatively, information regarding the item 10 and the materials from which the item 10 was formed may be determined through an analysis of the one or more images captured from the item 10. Such images, information or data and testing results may be forwarded to a server 112 operated by or maintained on behalf of the online marketplace. For example, a metric or vector that summarizes or represents a tactile feel of the item 10 may be calculated based on the testing results and/or the images, and stored in the server 112.

Figure 1B:
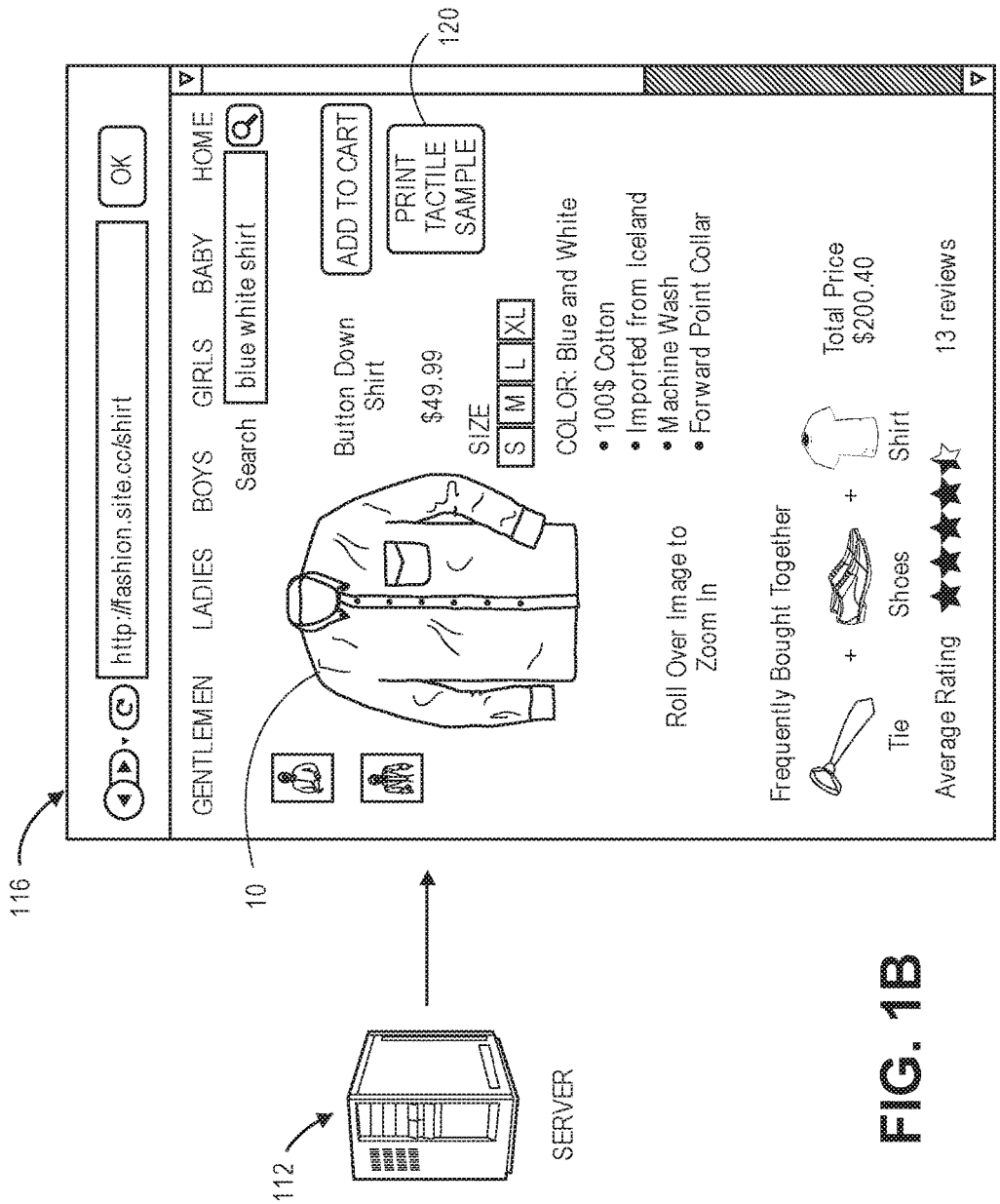

As is shown in FIG. 1B, subsequently, the images, information or data and testing results may be used to develop a network page regarding the item, viz., an item details page 116, that may be hosted by the marketplace. The item details page 116 includes a name of the item 10, a price of the item 10, size selectors, details and images of the item 10, as well as information or data regarding complements to the item 110 and customer ratings of the item 10. The item details page 116 further includes one or more other interactive features for searching for other items or categories of items, as well as interactive features for completing a purchase of the item 10. Additionally, the item details page 116 also includes an interactive feature 120 for requesting a tactile sample of the item 10.

Figure 1C:
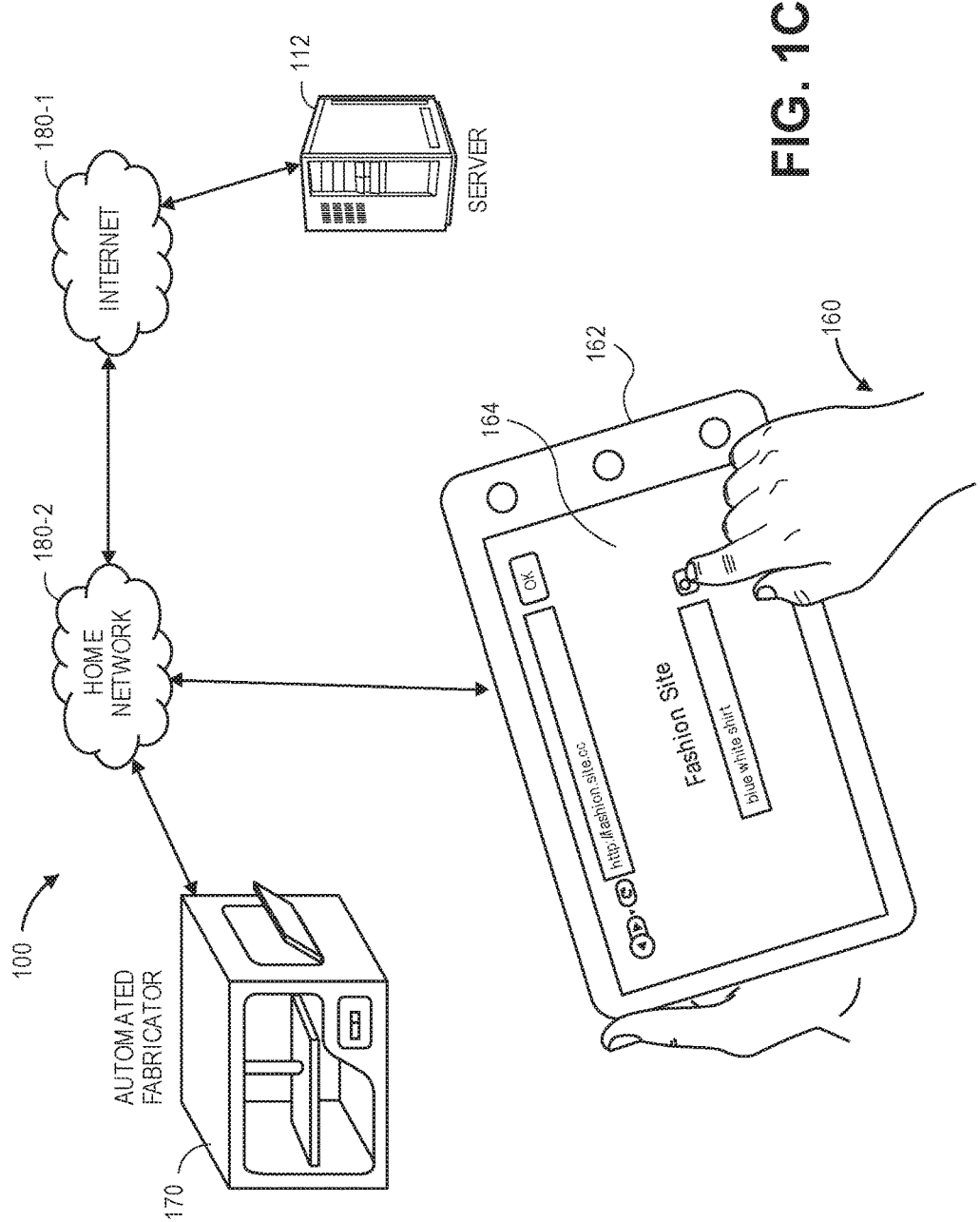

The item details page 116 may be identified and accessed by customers who visit the online marketplace. For example, as is shown in FIG. 1C, a customer 160 may use the client device 162 to access the online marketplace via a browser 164. The client device 162 and the automated fabricator 170 may be connected to a home network 180-2 (e.g., a personal network or intranet) that is itself connected to a network 180-1 (e.g., the Internet). Thus, the client device 162 may be used to retrieve information or data from the marketplace server 112, such as by entering one or more search terms or keywords (viz., "blue white shirt") into a text box or search engine that may be associated with the online marketplace.

As is shown in FIG. 1D, the item details page 116 is displayed on the client device 162. From the item details page 116, the customer 160 may request to print a tactile sample of the item 10 using the automated fabricator 170 by selecting the interactive feature 120.

Figure 1E:
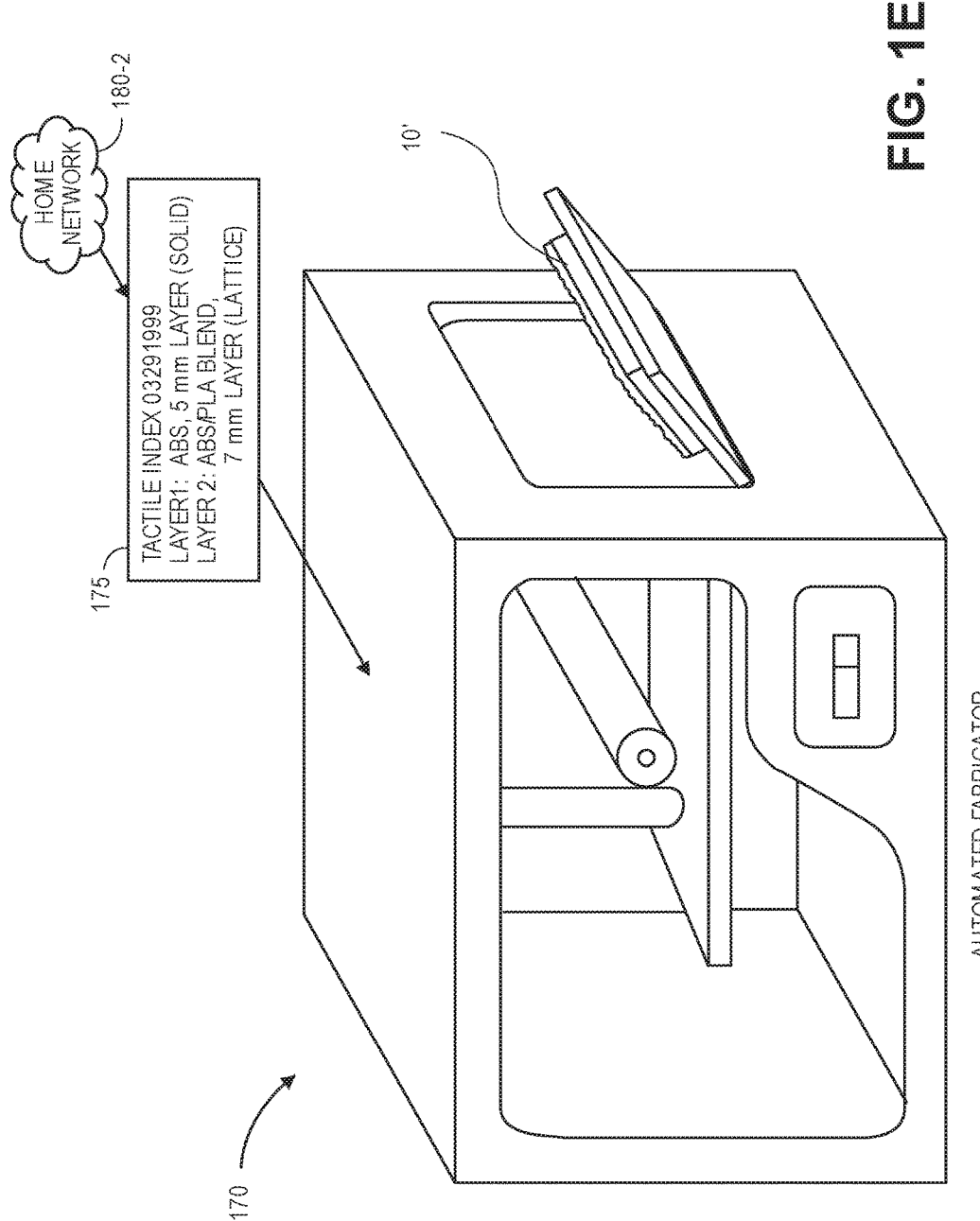

As is shown in FIG. 1E, selecting the interactive feature 120 causes a set of production information 175 regarding the item 10 (e.g., computer-aided drafting files or other design information or instructions for fabricating the item 10) to be downloaded over the networks 180-1, 180-2 to the client device 162 or the automated fabricator 170, which may then interpret the production information 175 and fabricate an item sample 10' using raw materials that are accessible to the automated fabricator 170. The item sample 10' may be specifically fabricated to mimic a touch or a feel of the item 10, or a look of the item 10, based on the production information 175, even though the item sample 10' may be formed from materials other than those that were used to manufacture the item 10 (e.g., cotton).

Figure 1F:
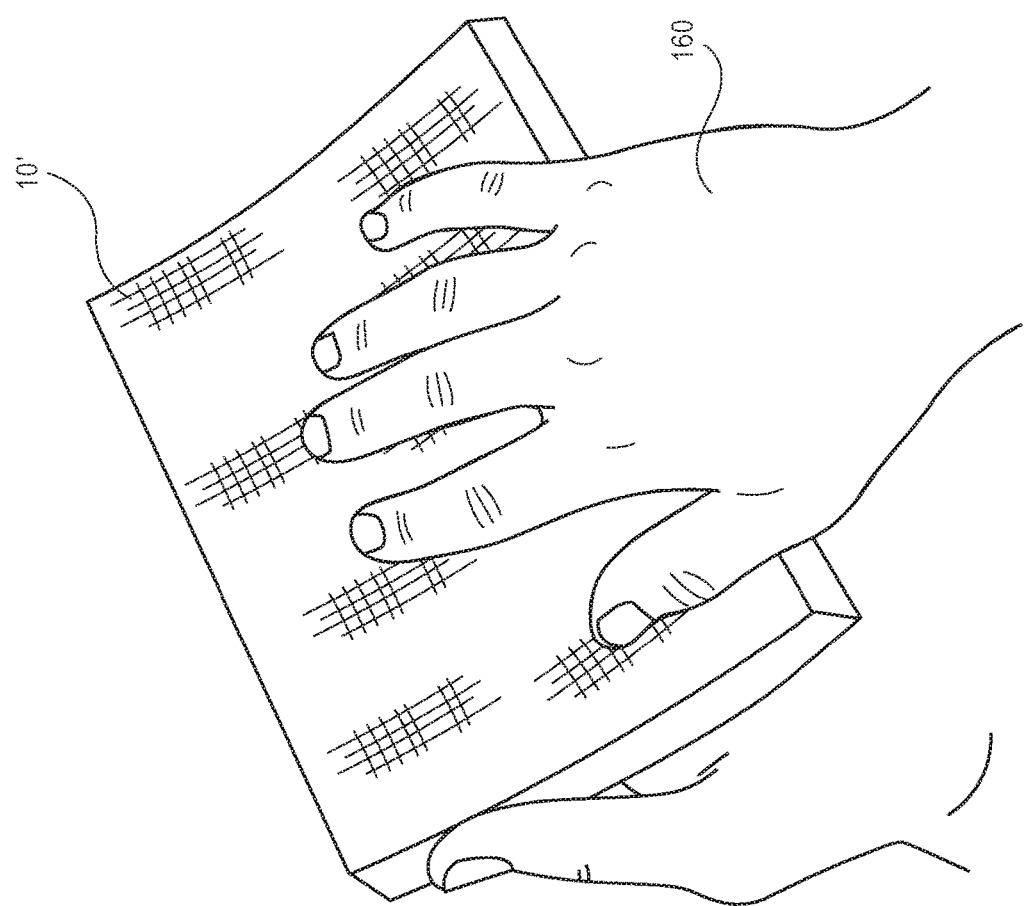

As is shown in FIG. 1F, after the automated fabricator 170 has completed the fabrication of the item sample 10', the customer 160 may manipulate the item sample 10', e.g., by holding the item sample 10' in his or her hands, or rubbing the item sample 10' on his or her arms, chest or other body parts that would come into contact with the item 10 during use, or visually evaluate the item sample 10'. Moreover, where the materials from which the item sample 10' was fabricated are reusable or recyclable, the customer 160 may return the item sample 10' to the automated fabricator 170, where the item sample 10' may be processed and reformed into another end product, or otherwise recycle the item sample 10' in any established manner.

Accordingly, the systems and methods of the present disclosure enable customers who engage in electronic commerce, e.g., by visiting one or more online marketplaces, to determine a tactile feel for an item, or to visually evaluate surface textures of the item, without having to purchase the item or visit a brick-and-mortar retailer in order to do so. Instead, a sample or simulated version of the item, or one or more cloths, fabrics or other materials from which the item is formed, e.g., a surface reproduction of the item, may be generated using an automated fabricator that may be accessed by a customer via a client device, and programmed to generate the sample or simulated version using any available raw materials. The systems and methods of the present disclosure may, therefore, narrow the gap between online marketplaces and brick-and-mortar retailers by providing customers with the ability to touch or feel, or examine, a facsimile of the item prior to purchasing the item.

Presently, customers who engage in electronic commerce can view and interpret information regarding apparel, accessories or other commercial items that is displayed on retail websites. In particular, customers who visit modern online marketplaces may visually recognize attributes such as colors, cuts, shapes or print patterns of such items, as represented in still or moving images, or even on virtual three-dimensional models. Unfortunately, customers who visit even the most advanced online marketplaces cannot personally assess critical attributes such as a "touch" or a "feel" of a commercial item, as network pages or sites are currently able to describe items only in visible or audible terms. In this regard, online marketplaces currently lag far behind their brick-and-mortar counterparts in their ability to provide customers with a complete understanding as to each of the attributes of an item for sale. In most cases, online customers do not know, until an item arrives, whether the "touch" or the "feel" of the item is desirable or even acceptable.

Additive manufacturing, which is sometimes referred to by the names "3D printing," or rapid prototyping, has evolved as a computer-based means for bringing digital designs to life. Use of the term "3D printing" is an intentional reference to two-dimensional printers of paper or other products but is also misleading, as automated fabricators, or "3D printers," typically function as miniature robotic factories and are not limited to "printing" applications. Currently, most automated fabricators operate by interpreting computer-based instructions to stack or form one or more raw materials into layers, and constructing an end product layer-by-layer based on such instructions, rather than by machining the end product from something larger (e.g., "subtractive" manufacturing), or by forming the end product exclusively from an injection mold. For example, an automated fabricator that is programmed with a design file (e.g., a computer-aided drafting file) for producing a plastic part or component may form liquid, molten or powder-based materials into a first layer or pattern. Next, once the first layer or pattern has solidified, the automated fabricator will form a second layer or pattern atop the first layer or pattern, using the same materials from which the first layer or pattern was formed, or one or more different materials.

Some procedures for forming objects in a layer-by-layer manner using automated fabricators, such as 3D printers, include "selective binding," in which an object is formed from powders and binding agents or heat, "selective solidification," in which layers of liquid are solidified one after another, or "selective deposition," in which materials are melted and deposited in specific locations, as necessary, before being allowed to cure or solidify. Additionally, objects may be formed by hybrid techniques that incorporate two or more of such procedures. Regardless of the procedures or techniques by which such layers are formed, the procedures or techniques may be repeated, as necessary, until a complete three-dimensional object is formed as desired.

Additive manufacturing may provide an enormous competitive advantage over traditional manufacturing processes, pursuant to which parts are typically constructed by removing materials through cutting and grinding or created through pseudo-additive processes such as injection molding. In contrast, additive manufacturing is fast, and may require only a single machine, with no need for retooling or reshaping for each individual product to be fabricated. Additive manufacturing may further remove or avoid limitations that presently inhibit the manufacture of items having high degrees of curvature or structural intricacies. Additive manufacturing processes may be used to construct complete pre-assembled systems that require no further assembly, and are presently used to construct a number of commercial items from a variety of plastics, metals, ceramics or other materials.

In this regard, automated fabricators hold promise for revolutionizing commerce in the same manner that two-dimensional printers (e.g., laser printers, ink-jet printers or the like) revolutionized photography and printing. Recent reductions in prices and sizes of automated fabricators, such as 3D printers, have enabled personalized versions of such machines to become available to regular consumers. Soon, the possibility exists for automated fabricators, such as 3D printers, to be as commonplace as 2D printers in homes and businesses across the United States.

Many consumer products are formed from fabrics having a variety of natural or synthetic materials. In woven fabrics, the term "weave" refers to a manner in which threads of fibers known as a warp (e.g., a set of threads held in tension in a lengthwise manner within a frame or a loom) and a weft, or a "woof" (e.g., threads that are drawn through warp threads), are combined in order to create a fabric. For example, cotton fibers may be woven according to one or more different techniques in order to create different fabrics such as poplins, zephyrs, twills, oxfords, dobbies, jacquards, piquets or fil-à-fils, each of which may feature different properties. A single fiber may be used to form multiple fabrics, each of which may be very different from one another. For example, cotton can be used to form flannel, felt, denim, damask, corduroy, chambray, canvas, calico, batiste, or, generally, woven fabric. In addition to cotton, many other fibers may also be woven into fabric, including linen, acetate, angora, wool, cashmere, silk, alpaca, argyle, jute, acrylic, camel hair, leather, bamboo, spandex, rayon or lyocell. Thus, a fabric formed from a plurality of fibers may not accurately be described by a name of the fabric, or by simply identifying a type of fibers from which the fabric was formed.

The systems and methods of the present disclosure are directed to generating samples of materials that mimic the touch and feel of one or more items, or the look of such items, using automated fabricators, including but not limited to 3D printers, based on production information that may be obtained over a network. More specifically, the present disclosure is directed to electronic commerce systems and methods that enable customers to evaluate one or more items for purchase from an online marketplace by printing or otherwise obtaining samples of fabrics, textures or other surface features of such items using an automated fabricator, such as a 3D printer. In some embodiments, an item that is offered for sale via an online marketplace may be subjected to a series of testing or evaluations to determine a plurality of parameters that describe a touch and feel of the item, or a look of the item. Subsequently, when a customer visits the online marketplace to view information and other details regarding the item, the customer may request metrics, production information or other data that describe the surface texture of the item, e.g., from a client device such as a laptop computer, desktop computer or mobile device. Once the metrics or other data describing the surface texture of the item are received, the client device may instruct one or more automated fabricators, e.g., 3D printers, to generate a sample of the item that simulates or reproduces the surface texture of the item.

The systems and methods of the present disclosure are also directed to simulating a tactile perception of a material fabric using an automated fabricator, which may be used to generate a printed sample that simulates or reproduces a tactile feeling experienced by users of a product, e.g., an article of apparel, or another consumer item. In most instances, an automated fabricator, such a 3D printer, does not have access to the same materials from which a product to be sampled was manufactured, and is not configured to exactly replicate the product from such materials. Instead, an automatic fabricator may generate a simulated version of the cloth fiber using raw materials such as thermoplastic polyurethane, graphene, ceramic composites, nano-fiber material, acrylics, or the like which may be formed into a product having one or more surfaces that simulate or reproduce the same tactile feeling or touch of the cloth fiber by printing the materials with an appropriate surface geometry or texture.

When a person handles or manipulates an item having one or more fabric surfaces, the person's interactions with the item deform the fabric, at least temporarily, and subject the fabric to differing levels of stress. A fabric perceptual simulator may thus replicate interactions between the user (e.g., the user's fingertips or other body parts) and the fabric by measuring characteristics of the fabric's deformation in response to human manipulation, or characteristics of the fabric's response to stress. Using the measured characteristics, a digital model of the touch and feel of the fabric, e.g., a model that mimics the fabric's response to contact with human skin, may be defined. Based on the digital model, a fabricated sample of the fabric may be formed from printing materials, e.g., various types of plastics, that are currently available for use in automated fabricators, such as 3D printers.

Human contact with a surface of an object generally triggers one or more signals or sensations in the brain, including but not limited to tactile sensations (e.g., craggy, itchy, picky, prickly, rough, scratchy, smooth, sticky, tickling), moisture sensations (e.g., clingy, damp, non-absorbent, sticky, sultry, wet), pressure (or fit) sensations (e.g., heavy, lightweight, loose, snug, soft, stiff) or thermal sensations (e.g., chill, cold, cool, hot, warm). A tactile feel of fabric, which is sometimes referred to as a handle of the fabric, may be quantified and represented according to any relevant standard. For example, values representative of smoothness, softness, stiffness, roughness, thickness, weight, warmth, hardness, elasticity, creasing propensity, drape or other tactile properties or characteristics of a given fabric may be measured or otherwise determined, e.g., using a Kawabata Evaluation System, a Fabric Assurance by Simple Testing (FAST) system, or any other system, and used to quantify a tactile feel of the fabric.

Some such values may represent intrinsic tactile properties of the fabric in response to manipulation, including but not limited to bending properties (e.g., rigidity or hysteresis in response to bending), tensile properties (e.g., tensile energies, tensile resilience, tensile strains), surface properties (e.g., surface roughness, coefficients of friction), shear properties (e.g., shearing rigidity, hysteresis of shear forces) or compression properties (e.g., compressional energy, compressional resilience, compression rates, fabric thickness, fabric weights per unit areas). Some other values may represent intrinsic tactile properties of the fabric as observed or detected in imaging data captured from the fabric. Still other values may be hybrid values that describe not only responses of the fabric to manipulation but also visual features of the fabric, including but not limited to any number of measures, metrics, information or other data regarding a tactile feel of the item.

Once such values are measured for a product, an automatic fabricator, such as a 3D printer, may be programmed to generate a printed sample of the product from one or more plastics or like materials, such that the printed sample features the same properties as the product. For example, an automated fabricator may print an arranged configuration, e.g., a predetermined weave and weft, of fibers on a micrometer or nanometer level in order to generate the same physical properties (e.g., flexing, draping or folding) as the actual fabric. Any values or metrics that are representative of properties of a fabric, including but not limited to values or metrics determined using a Kawabata Evaluation System, a Fabric Assurance by Simple Testing (FAST) system, or any other system, may be measured and used to generate simulated samples or models of the fabric accordingly.

After a simulated fabric or other sample of an item, e.g., a surface reproduction of the item, has been generated by an automated fabricator, tactile properties of the simulated fabric may be measured and determined, for example, according to the same testing procedures that were executed on the fabric of the actual item, and compared to the tactile properties determined for that fabric. Any differences between the tactile properties or other attributes of the simulated fabric, and the tactile properties or other attributes of the actual product, may be used to generate instructions for fabricating the simulated fabric accordingly.

By varying geometric attributes or layers of a simulated fabric, the tactile feel of the actual fabric, or the tactile properties or fabric parameters of the actual fabric, may be more closely approximated in the simulated fabric. Instructions for generating the simulated fabric may vary based on not only the tactile properties of the actual fabric being modeled, but also the specific automated fabricator that was used to generate the simulated fabric or the specific materials from which the simulated fabric was generated, or any other factor. Any differences between tactile properties of a simulated fabric and tactile properties of an actual fabric may be determined and used to provide feedback regarding macroscopic properties of the simulated fabric generated by a given automated fabricator using a given material. Thus, different fabrication or printing geometries (e.g., weaves) may be determined for each different printing material, such as thermoplastic polyurethane, graphene, ceramic composites, nano-fiber material or acrylics, in order to approximate a feel of the same actual fabric.

Moreover, the systems and methods of the present disclosure may further account for differences in tactile sensitivity between different customers, who may exist in different cultures, live in different parts of the world, or be members of different age groups or genders. Variations in sensitivity to touch may arise for any reason, including but not limited to differences in numbers of touch receptors in an epidermis of a fingertip. For example, most humans have an average of 30,000 touch receptors to per square inch at the age of 10, and about 6,000 touch receptors per square inch at the age of 50. Each fingertip typically features an average of 3000 touch receptors for sensing pressure, and each touch receptor senses stimuli in overlapping fields having widths of approximately one-tenth of an inch.

Additionally, a touch and a feel of a simulated fabric or other printed sample may be further augmented by matching colors and/or reflective properties of the simulated fabric to those of an actual fabric. For example, surface color and reflectance properties of a simulated fabric can be selected by choosing an appropriate color of a printing material, and manipulating a geometrical structure to be formed on a surface of the simulated fabric, in order to achieve desired reflectance properties. A look of a fabric is determined by an interaction of incident light with its structural texture and surface geometry, while reflectance properties of a fabric may be represented by bidirectional reflectance distribution functions (BRDF), bidirectional texture functions (BTF), or bidirectional surface scattering reflectance distribution functions (BSSRDF). Similarly, shine properties, matte properties, glossiness, or appearance modeling of an actual fabric can be replicated by automatically fabricating an appropriate geometrical texture or structure in a simulated fabric. Thus, in accordance with the present disclosure, the visual and tactile perception of a simulated fabric, e.g., a printed sample generated by an automated fabricator, may closely approximate the visual and tactile (or perceptual) properties of an actual fabric, even though the materials from which the printed sample is formed are very different from those of the actual fabric. By manipulating colors, patterns, surface structures or textures, or reflectances, of a simulated fabric, visual and tactile properties such as a look, a touch or a feel of an actual fabric may be replicated. A simulated fabric that is generated based on tactile properties representative of an actual fabric may thus closely resemble the actual fabric in terms of not only touch and feel, but also color, pattern, texture or reflectance.

Figure 2:
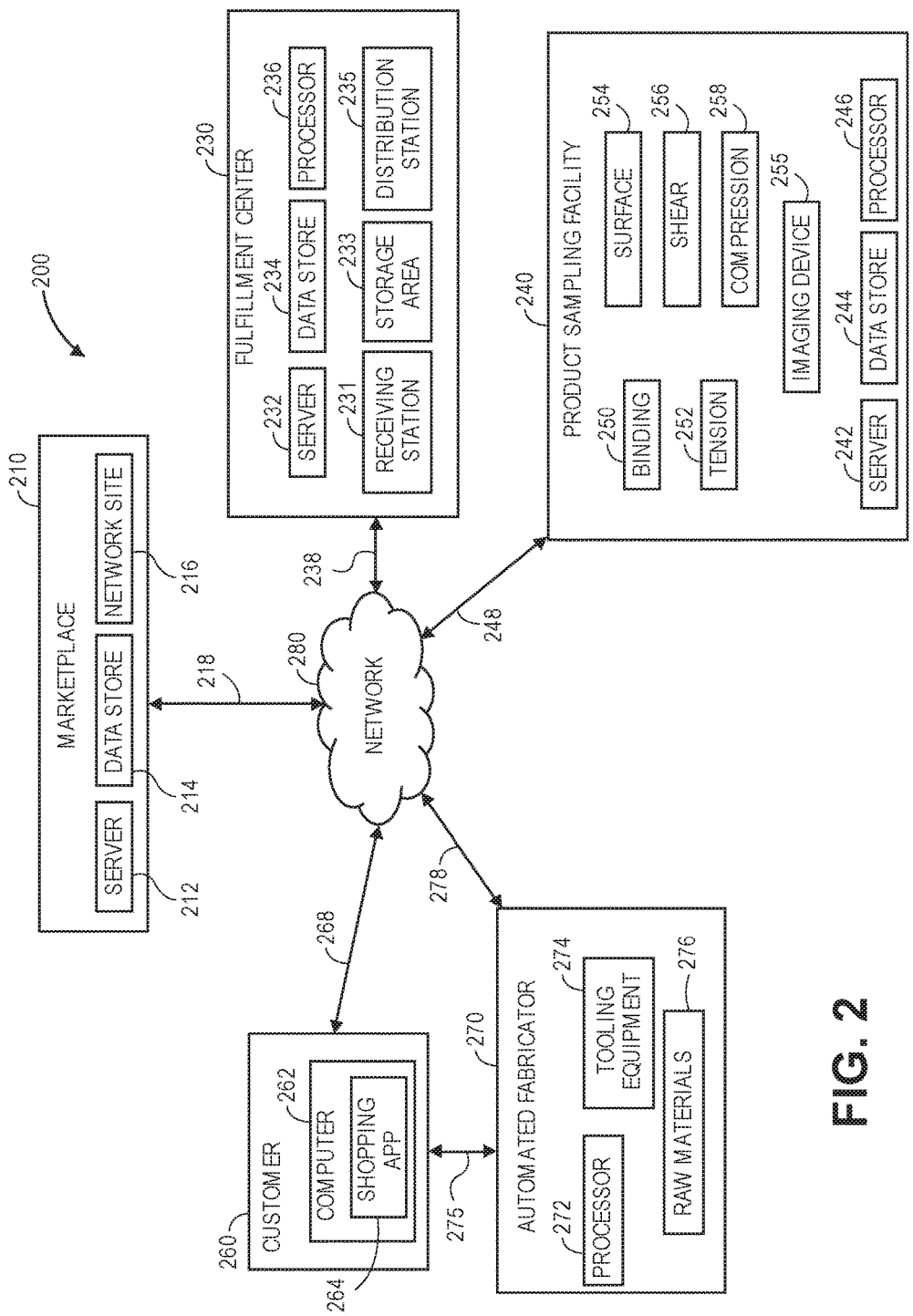
FIG. 2 is a block diagram of components of one system for providing tactile or visual feedback in accordance with embodiments of the present disclosure.

Referring to FIG. 2, a block diagram of components of one system 200 for providing tactile or visible feedback in accordance with embodiments of the present disclosure is shown. The system 200 includes a marketplace 210, a fulfillment center 230, a product sampling facility 240, a customer 260 and an automated fabricator 270 that are connected to one another across a network 280, which may include the Internet in whole or in part. Except where otherwise noted, reference numerals preceded by the number "2" shown in FIG. 2 indicate components or features that are similar to components or features having reference numerals preceded by the number "1" shown in FIGS. 1A through 1F.

The marketplace 210 may be any entity or individual that wishes to make items from a variety of sources available for download, purchase, rent, lease or borrowing by customers using a networked computer infrastructure, including one or more physical computer servers 212 and data stores (e.g., databases) 214 for hosting a network site 216 (e.g., a web site). The marketplace 210 may be physically or virtually associated with one or more storage or distribution facilities, including but not limited to the fulfillment center 230. The network site 216 may be implemented using the one or more servers 212, which connect or otherwise communicate with the one or more data stores 214 as well as the network 280, as indicated by line 218, through the sending and receiving of digital data. The servers 212 may cause the display of information associated with the network site 216 in any manner, e.g., by transmitting code such as Hypertext Markup Language (HTML) code over the network 280 to another computing device that may be configured to generate and render the information into one or more pages and to display such pages on a computer display of any kind. Moreover, the data stores 214 may include any type of information regarding items that have been made available for sale through the marketplace 210, or ordered by customers from the marketplace 210.

The fulfillment center 230 may be any facility that is adapted to receive, store, process and/or distribute items on behalf of the marketplace 210. As is shown in FIG. 2, the fulfillment center 230 includes a networked computer infrastructure for performing various computer-related functions associated with the receipt, storage, processing and distribution of such items, including one or more physical computer servers 232, data stores (e.g., databases) 234 and processors 236, that may be provided in the same physical location as the fulfillment center 230, or in one or more alternate or virtual locations, e.g., in a "cloud"-based environment. The fulfillment center 230 may also include stations for receiving, storing and distributing items to customers, such as one or more receiving stations 231, storage areas 233 and distribution stations 235. The fulfillment center 230 may also include any number of workers or other designated personnel tasked with performing one or more tasks within the fulfillment center 230, e.g., by handling or transporting items within the fulfillment center 230, or operating one or more pieces of equipment therein.

The fulfillment center 230 may operate one or more order processing and/or communication systems using computer devices in communication with one or more of the server 232, the data store 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations 231 featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas 233 including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations 235 where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

The product sampling facility 240 may be any facility that is configured to determine one or more properties or characteristics of surfaces of items that are to be offered for sale via the marketplace 210. As is shown in FIG. 2, the product sampling facility 240 may include a networked computer infrastructure for performing various computer-related functions associated with the testing of such items, including one or more physical computer servers 242, data stores (e.g., databases) 244 and processors 246, that may be provided in the same physical location as the product sampling facility 240, or in one or more alternate or virtual locations, e.g., in a "cloud"-based environment. The product sampling facility 240 may operate one or more testing systems using computer devices in communication with one or more of the server 242, the data store 244 and/or the processor 246, or through one or more other computing devices or machines that may be connected to the network 280, as is indicated by line 248, in order to transmit or receive information in the form of digital or analog data, or for any other purpose.

For example, the testing systems provided at the product sampling facility 240 may further include one or more pieces or units of equipment including components for crimping, bending, stretching, pulling, twisting, torqueing or pounding materials, or otherwise subjecting materials to forces of tension, compression or shear, as well as one or more moments. As is shown in FIG. 2, the product sampling facility 240 may include one or more units of bending equipment 250, tension equipment 252, surface testing equipment 254, shear equipment 256 or compression equipment 258. The product sampling facility 240 may also include an imaging device 255.

Each of the bending equipment 250, the tension equipment 252, the surface testing equipment 254, the shear equipment 256 or the compression equipment 258 may include any number of slides, drums, cranks, drives, rails or anvils, as well as any type or form of power source for conducting testing operations. The product sampling facility 240 may further include one or more sensors or detectors (not shown) for monitoring testing evaluations or capturing data therefrom, e.g., scales, meters, stress gages, strain gages or the like, and interfaces with one or more computer devices, including one or more of the server 242, the data store 244 and/or the processor 246, or one or more other computing devices or machines that may be connected to the network 280. In some embodiments, the product sampling facility 240 may include one or more components of a Kawabata Evaluation System or a Fabric Assurance by Simple Testing (FAST) system.

The imaging device 255 may be any form of optical recording device that may be used to photograph or otherwise record imaging data regarding items that may be offered for sale via the marketplace 210; received at, stored in or distributed from the fulfillment center 230; or evaluated at the product sampling facility 240, or for any other purpose. The imaging device 255 may include a lens or lens module and one or more sensors, memory or storage components or processors, and such sensors, memory or storage components or processors may further include one or more photosensitive surfaces, filters, chips, electrodes, clocks, boards, timers or any other relevant features (not shown). The imaging device 255 may be configured to capture imaging data in the form of one or more still or moving images of any kind or form, as well as any relevant audio signals or other information, and may be coupled to one or more of the server 242, the data store 244 or the processor 246 by way of a wired or wireless connection that may be dedicated or comprise all or part of an internal network (not shown), and/or adapted or otherwise configured to communicate with the marketplace 210, the fulfillment center 230, the customer 260 or the automated fabricator 270, or with one or more other computer devices by way of the network 280.

Imaging data captured using the imaging device 255 may be used for any purpose, including but not limited to the marketing of items via the online marketplace 210 (e.g., for display on one or more network pages or sites), or for determining information regarding physical and/or tactile properties of surfaces of such items. Additionally, although the product sampling facility 240 of FIG. 2 includes a single box corresponding to one imaging device 255, those of ordinary skill in the pertinent arts will recognize that any number or type of imaging devices may be provided in accordance with the present disclosure, including but not limited to digital cameras, depth sensors or range cameras, infrared cameras, radiographic cameras or other optical sensors.

The customer 260 may be any entity or individual that wishes to download, purchase, rent, lease, borrow or otherwise obtain items (e.g., goods, products, services or information of any type or form) from the marketplace 210. The customer 260 may utilize one or more computing devices 262 (e.g., smartphones, tablet computers, laptop computers, desktop computers, as well as computer devices provided in automobiles, wristwatches, home appliances, televisions or any other machine) that may operate or access one or more software applications, such as a browser (not shown) or a shopping application 264, and may be connected to or otherwise communicate with the marketplace 210, the fulfillment center 230, the product sampling facility 240 or the automated fabricator 270 through the network 280, as indicated by line 268, by the transmission and receipt of digital data. Alternatively, the computer devices 262 may optionally be directly connected to the automated fabricator 270, e.g., by wired or wireless connections, as indicated by line 275. Moreover, the customer 260 may also receive deliveries or shipments of one or more items from facilities maintained by or on behalf of the marketplace 210, such as the fulfillment center 230, or from one or more manufacturers, merchants, sellers or vendors (not shown).

The automated fabricator 270 may be a 3D printer or any other device or component for automatically forming an end product according to one or more sets of computer instructions. As is shown in FIG. 2, the automated fabricator 270 includes one or more processors 272, tooling equipment 274 and a plurality of raw materials 276. The tooling equipment 274 may include any machines or components for manipulating the raw materials 276 within the automated fabricator 270 to form the end product therefrom. For example, in some embodiments, the tooling equipment 274 may include one or more filaments, heads, blades, nozzles, motors, rollers, heat sources, radiation sources or other elements for molding, shaping, forming, curing, solidifying or depositing layers of one or more of the raw materials 276, or otherwise manipulating the raw materials 276, and forming an end product therefrom.

The raw materials 276 may include any liquid, gaseous or solid materials that may be accessible to the tooling equipment 274 and molded, shaped, formed, cured, solidified or deposited into an end product. For example, the raw materials 276 may be maintained or stored in one or more vats, vessels, tanks, bins, platforms or other storage spaces that are within a chamber of the automated fabricator 270, or accessible thereto. In some embodiments, the raw materials 276 may include thermoplastic materials including but not limited to acrylonitrile-butadiene-styrene, nylon, high density polyethylene, polycarbonate, polyetherimide, polyether ether ketone, polylactic acid, poly(meth)acrylate, polyphenylene sulphone, polystyrene, as well as one or more polymers, copolymers or ionomers thereof, or combinations of any of such materials. In some embodiments, the raw materials 276 may include aluminum, antimony, barium, bismuth, cesium, gold, lead, iodine, tantalum, tin or tungsten, or one or more oxides, nitrides or alloys thereof. In some embodiments, the raw materials 276 may include not only liquids, gases or solids but also gels, resins, plasmas or any other types or classes of materials.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent arts will recognize that users of such computers, servers, devices and the like may operate a keyboard, keypad, mouse, stylus, touchscreen, or other device (not shown) or method (e.g., speech recognition or gesture recognition devices or techniques) to interact with the computers, servers, devices and the like, or to "select" an item, link, node, hub or any other aspect of the present disclosure.

The servers 212, 232, 242 and/or the computer device 262 may include one or more uniprocessor systems including one processor each, or a multiprocessor system including several processors (e.g., two, four, eight, or another suitable number), and may be capable of executing instructions. Likewise, the processor 236, the processor 246 or the processor 272 may also be a uniprocessor system or a multiprocessor system and capable of executing instructions. For example, in some embodiments, the servers 212, 232, 242 and/or the computer device 262 may include a general-purpose or embedded processor implementing any of a number of instruction set architectures (ISAs), such as the x86, PowerPC, SPARC, or MIPS ISAs, or any other suitable ISA. Similarly, the processor 236, the processor 246 or the processor 272 may be general-purpose or embedded processors. Where the servers 212, 232, 242 and/or the computer device 262 include multiprocessor systems, or where any of the processor 236, the processor 246 or the processor 272 are multiprocessor systems, each of the processors within the multiprocessor system may operate the same ISA, or different ISAs Those of ordinary skill in the pertinent arts will understand that process steps described herein as being performed by a "marketplace," a "fulfillment center," a "product sampling facility," a "customer" or an "automated fabricator," or like terms, may be automated steps performed by their respective computer systems, or implemented within software modules (or computer programs) executed by one or more general purpose computers. Those of ordinary skill in the pertinent arts would also recognize that process steps described as being performed by a "marketplace," a "fulfillment center," a "product sampling facility," a "customer" or an "automated fabricator," or like terms, may be typically performed by a human operator, but could, alternatively, be performed by an automated agent.

The marketplace 210, the fulfillment center 230, the product sampling facility 240, the customer 260 and/or the automated fabricator 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the servers 212, 232, 242, the computer 262 and/or the processors 236, 246, 272 may be adapted to transmit information or data in the form of synchronous or asynchronous messages between or among the marketplace 210, the fulfillment center 230, the product sampling facility 240, the customer 260 and/or the automated fabricator 270, or any other computer device, in real time or in near-real time, or in one or more offline processes, via the network 280. Those of ordinary skill in the pertinent arts would recognize that any of the marketplace 210, the fulfillment center 230, the product sampling facility 240, the customer 260 and/or the automated fabricator 270 may operate any of a number of computing devices that are capable of communicating over the network 280, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232, 242, the computer 262 and/or the processors 236, 246, 272, or any other computers or control systems utilized by the marketplace 210, the fulfillment center 230, the product sampling facility 240, the customer 260 and/or the automated fabricator 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
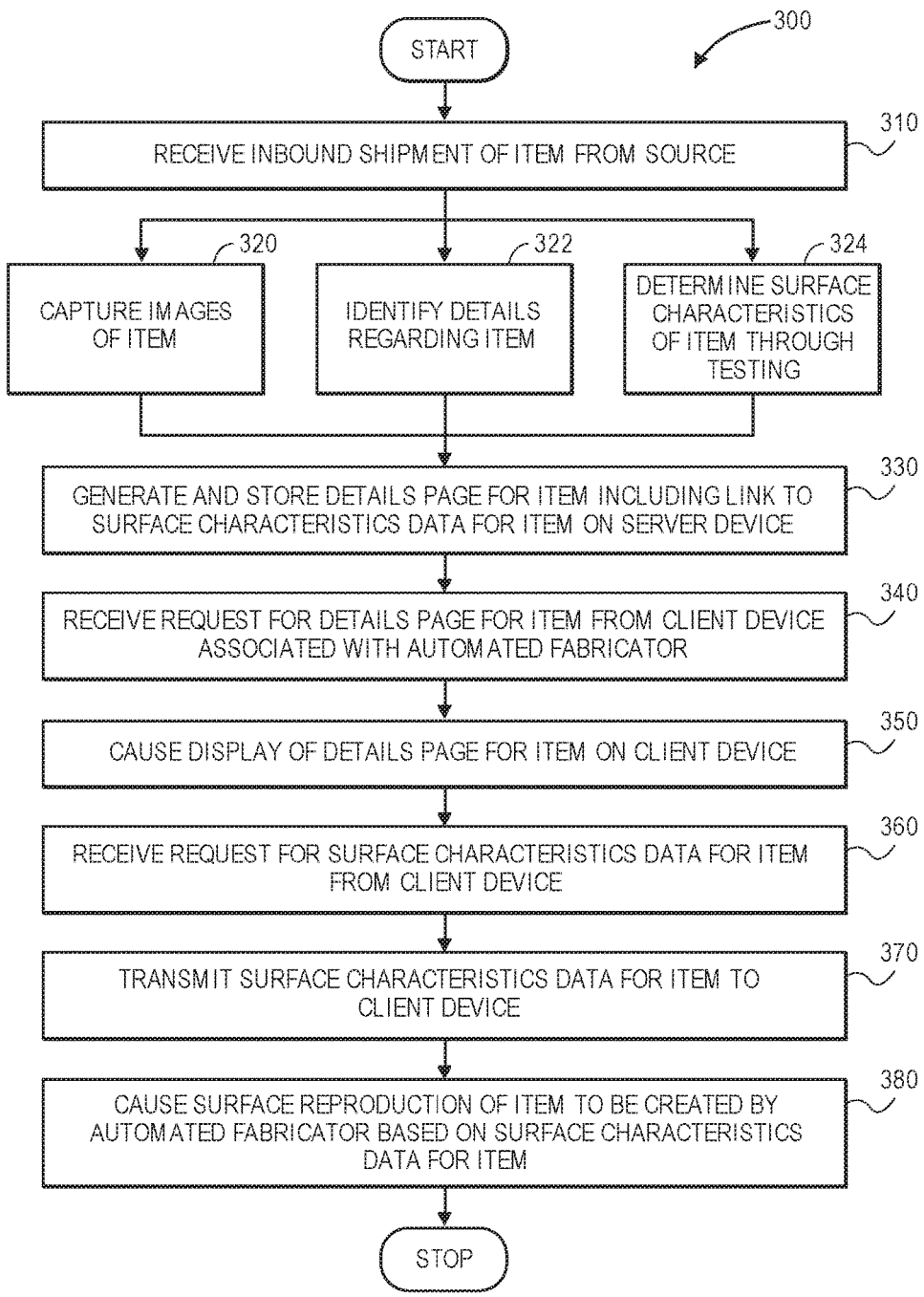
FIG. 3 is a flow chart of one process for providing tactile or visual feedback in accordance with embodiments of the present disclosure.

As is discussed above, some embodiments of the present disclosure are directed to enabling customers to generate product samples or simulated fabrics having the same touch or feel as an actual product, or the same look as the actual product, that they are contemplating purchasing from an online marketplace. Such processes typically begin when an inbound item is received from a manufacturer, a merchant, a seller or a vendor, or another source, and an item details page regarding the item is prepared. Referring to FIG. 3, a flow chart 300 representing one process for providing tactile or visual feedback in accordance with embodiments of the present disclosure is shown.

At box 310, an inbound shipment including an item is received from a source. For example, the source may be a manufacturer of the item, or a merchant, a seller or a vendor of the item, and the item may be received at a fulfillment center, a warehouse or another facility associated with an online marketplace. Alternatively, the item may be received from another fulfillment center, another warehouse or another facility associated with the marketplace, or from another marketplace. Thereafter, in parallel, at box 320, images are captured from the item, while at box 322, details regarding the item are identified, and at box 324, surface characteristics of the item are determined through testing. For example, the item may be photographed upon its arrival at a fulfillment center or, alternatively, one or more stock images of the item may be obtained. Similarly, details such as a source of the item, a geographic origin of the item, specifications, ingredients, operational ratings, instructions or text-based descriptions of the item, or any other relevant information may be manually entered or, alternatively, automatically identified using a stock keeping unit ("SKU") or other identifier of the item. Likewise, the item may be subjected to any number of testing procedures, the results of which may be expressed in one or more metrics or values representative of the bending, tensile, surface, shear and/or compression properties, or other characteristics, of surface of the item. One or more of such properties may also be determined through an analysis of photographs or other imaging data of the item.

At box 330, an item details page that includes a link to the surface characteristics data for the item is generated and stored on a server. For example, referring again to FIG. 1B, a network page such as the item details page 116 including a name, a price, details or images of an item, information or data regarding complementary items, or customer ratings of the item may be manually or automatically generated and stored in association with one or more network sites of an online marketplace. The item details page may further include one or more interactive features for selecting options, variations or models of the item (e.g., sizes or colors), as well as interactive features for completing a purchase of the item. Additionally, the item details page includes a link to the surface characteristics data determined at box 324, which may be represented as a scalar or vector, or encoded into a computer-aided drafting file, a design file, or a file having any other format.

At box 340, a request is received for the item details page from a client device that is associated with an automated fabricator. For example, the request may be received from any computing device having the capacity to access and recall information and data, including the item details page generated and stored at box 330, including but not limited to a smartphone, a tablet computer, a laptop computer, a desktop computer, a television, or any other type or form of Internet-enabled device. Additionally, the client device may have access to one or more 3D printers or other automated fabricators. Such machines may be connected to the client device via wired or wireless means, and may reside in the same physical location as the client device, or in an alternate location, such as a fabricating service associated with a convenience store or other retail establishment.

At box 350, the item details page is caused to be displayed on the client device, in response to the request, and at box 360, a request for surface characteristics data regarding the item is received from the client device. For example, the item details page may include a set of text, image, button, icon or other interactive feature that is hyperlinked to one or more data files including the surface characteristics data determined at box 324, which may be downloaded upon an activation or request from a customer viewing the item details page.

At box 370, the surface characteristics data for the item is transmitted to the client device over the network, and at box 380, a surface reproduction of the item is caused to be created by the automated fabricator based on the surface characteristics data, e.g., in a layer-by-layer format from one or more raw materials. For example, the client device may read and interpret the surface characteristics data, and transmit instructions for generating the surface reproduction on any basis, including but not limited to the operational capacities of the automated fabricator, the available raw materials, or any other factor. Alternatively, the surface characteristics data may be downloaded directly to the automated fabricator in response to the request received from the client device, and the automated fabricator may automatically generate the surface reproduction upon its receipt of the surface characteristics data.

Figure 4A:
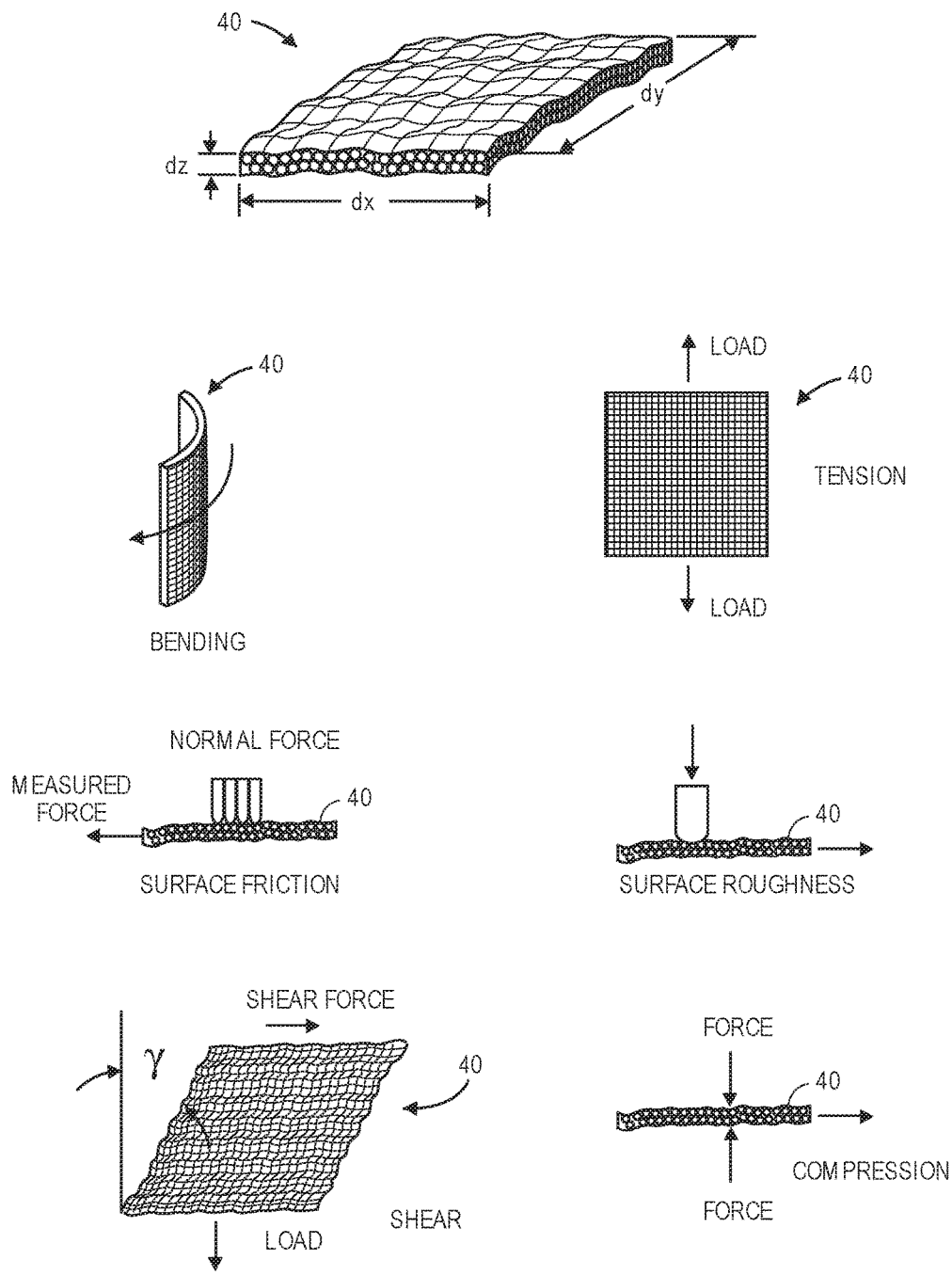
FIGS. 4A and 4B are views of a portion of a surface of one item for which tactile or visual feedback may be provided in accordance with embodiments of the present disclosure.
Figure 4B:
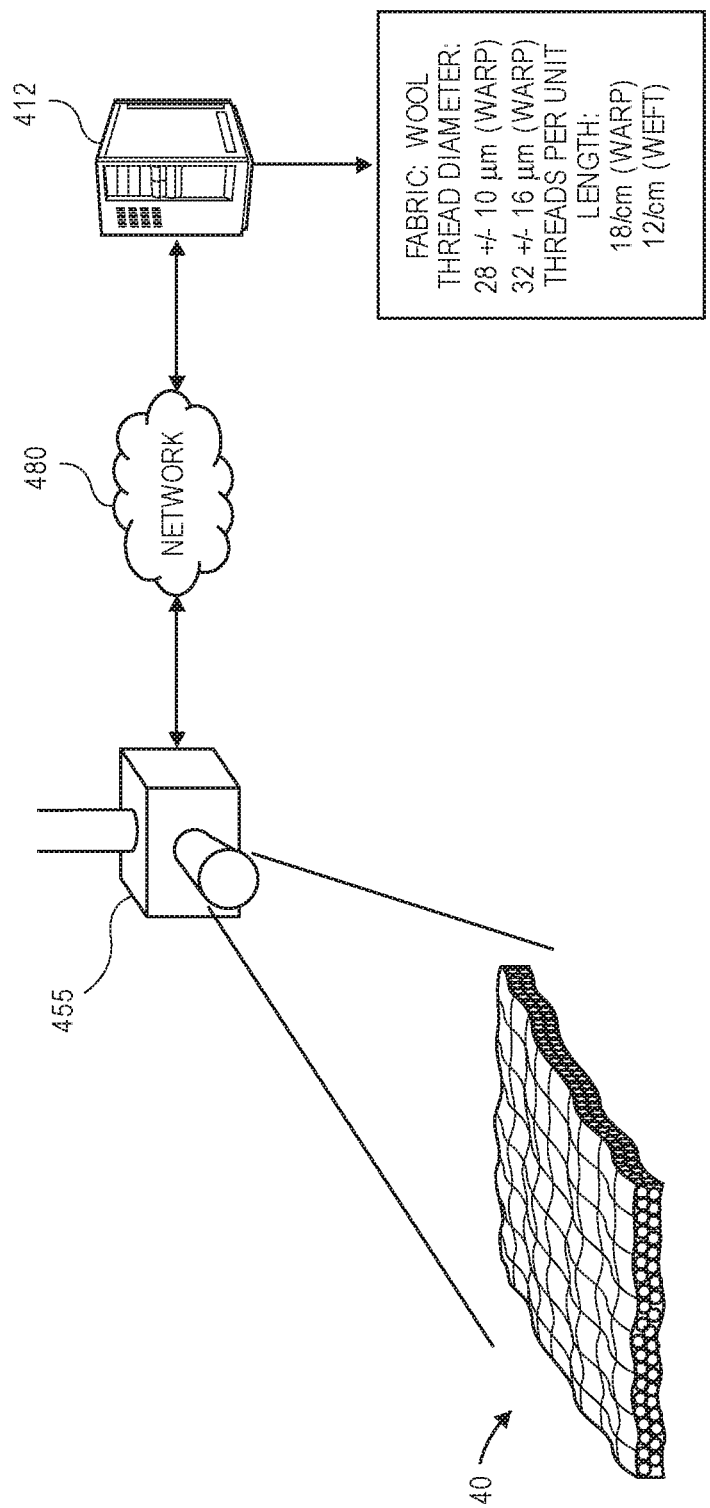

As is discussed above, characteristics regarding surfaces of items that are offered for sale at an online marketplace may be determined in response to one or more testing evolutions or procedures. Referring to FIGS. 4A and 4B, views of a portion of a surface 40 for which tactile or visual feedback may be provided in accordance with embodiments of the present disclosure is shown. Except where otherwise noted, reference numerals preceded by the number "4" shown in FIGS. 4A and 4B indicate components or features that are similar to components or features having reference numerals preceded by the number "2" shown in FIG. 2 or by the number "1" shown in FIGS. 1A through 1F.

As is shown in FIGS. 4A and 4B, the surface 40 is a portion of a fabric having a representative length dx, a representative width dy and a representative thickness dz. Values representative of tactile properties or other characteristics of the surface 40, including metrics or other values corresponding to smoothness, softness, stiffness, roughness, thickness, weight or other factors, may be determined as a result of one or more testing procedures or visual evaluations.

For example, as is shown in FIG. 4A, in some embodiments, a specific deformation may be applied to the sample 40, and the loads, forces or moments required to impose the specific deformation may be measured accordingly. For example, metrics such as a bending stiffness or rigidity, a bending elastic potential, a bending curvature or an elastic bending moment of the sample 40 may be determined according to one or more bending tests. Additionally, metrics such as tensile stress or tensile strains, or energy absorbed or resilience, of the sample 40 may be determined by applying loads to the sample 40 in tension, and measuring deflections or other reactions of the sample 40 in response to such loads. As another example, metrics representative of surface friction of the sample 40 may be determined by applying a normal (i.e., perpendicular) force to the sample 40, and measuring a lateral force required to cause the sample 40 to move in response to the normal force. Similarly, metrics representative of a roughness of the sample 40 may be determined by observing surface variations within the sample 40 in response to internal or external forces. Metrics representative of shear of the sample 40 may be determined by applying forces in parallel to edges of the sample 40, and observing a response of the sample 40. Likewise, metrics representative of compression or compressibility of the sample 40 may be determined by compressing the sample 40, e.g., by normal forces, and observing a response of the sample 40. In some embodiments, such metrics may be determined using one or more components of a Kawabata Evaluation System, a Fabric Assurance by Simple Testing (FAST) system, or like systems.

Additionally, as is shown in FIG. 4B, in some embodiments, information or data regarding the sample 40 may be determined from a visual inspection using one or more imaging devices. For example, an imaging device 455 may be configured to capture imaging data regarding the sample 40, and information or data regarding materials from which the sample was formed, e.g., dimensions or contents of a plurality of warp or weft fibers woven together, as well as one or more values representative of a touch or a feel of the fabric, or other tactile properties of the fabric, may be determined from the imaging data.

Instructions for generating a sample of a simulated fabric that mimics the touch and feel of an actual fabric may be customized based on capacities of an automated fabricator, or materials that are available to the automated fabricator. As is discussed above, where characteristics of a fabric such as smoothness, softness, stiffness, roughness, thickness or weight are determined, a sample that shares the same characteristics may be formed from any number or combination of raw materials, or according to any procedure based on the available tooling equipment or other features of the automated fabricator. Instructions for generating samples of a simulated fabric that mimic the touch and feel of the actual fabric may vary based on the materials used to fabricate the simulated fabric, or the machine in which the simulated fabric is fabricated from such materials. Thus, instructions for generating the sample may be customized based on capacities or other attributes of an automated fabricator, or on the availability of raw materials to the automated fabricator.

Figure 5:
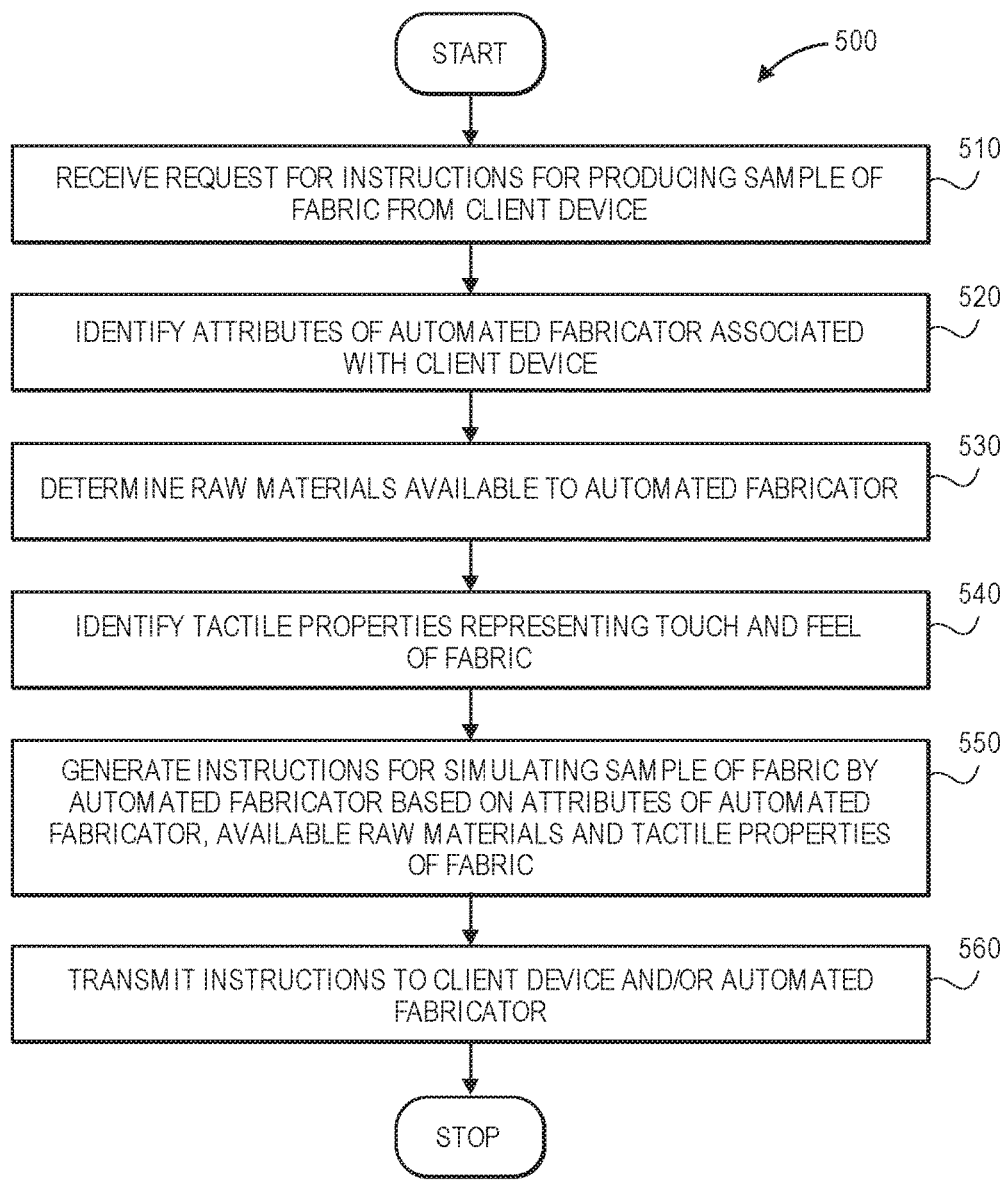
FIG. 5 is a flow chart of one process for providing tactile or visual feedback in accordance with embodiments of the present disclosure.

Referring to FIG. 5, a flow chart 500 representing one process for providing tactile or visual feedback in accordance with embodiments of the present disclosure is shown. At box 510, a request for instructions for producing a sample of fabric is received from a client device. For example, the request may comprise a selection of a hyperlinked feature on a network page, such as a selection of the interactive feature 120 on the item details page 116 of FIG. 1B, received by a server-side computer device associated with an online marketplace. Alternatively, the request may be received via E-mail, text message or any other electronic messaging technique or channel.

At box 520, attributes of an automated fabricator associated with the client device are determined. In some embodiments, an automated fabricator may be identified by the client device or a server-side computer device from cookies, an Internet Protocol ("IP") address or any other identifier associated with the client device or with the automated fabricator, and attributes of the automated fabricator (e.g., working volume, numbers of heads, memory, network connectivity) may be determined based on the identifier. In some other embodiments, attributes of the automated fabricator may be expressly identified by a customer operating the client device, e.g., by a selection from a drop-down menu, or based on an entry in a text box or other feature, and information regarding such attributes may be determined by the client device, or provided to the server-side computer device. The automated fabricator may be associated with an owner or operator of the client device, or may be provided in a different location or under separate control, e.g., as a commercial service.

At box 530, raw materials that are available to the automated fabricator are determined. For example, capacities or statuses of the raw materials that are available to or may otherwise be accessed by the automated fabricator may also be stored in cookies or other data files or identifiers on the client device. Information regarding the availability of such raw materials may also be "pushed" from the automated fabricator or the client device to a server associated with an online marketplace, or the server may "pull" the information regarding the availability of such raw materials from the automated fabricator or the client device. Alternatively, information regarding the available raw materials may be estimated or deduced based on an operational history of the automated fabricator, or on any other basis.

At box 540, tactile properties representing the touch and the feel of the fabric are identified. One or more values representative of tactile properties of the fabric, e.g., smoothness, softness, stiffness, roughness, thickness, weight, or any other attributes, may be calculated based on data regarding surface characteristics of the fabric by a server-side computer device, after the capacities of the automated fabricator and the raw materials that are available to the automated fabricator are identified. The surface characteristics of the fabric may be determined in response to a number of mechanical or visual evaluations. Alternatively, the tactile properties may be calculated by the client device upon receiving surface characteristic data for the fabric from a server-side computer device, e.g., a server associated with an online marketplace.

At box 550, instructions for simulating a sample of fabric by the automated fabricator are generated based on the attributes of the automated fabricator, the raw materials that are available to the automated fabricator and/or the tactile properties of the fabric. The instructions may be in any format, including but not limited to .STL files, .OBJ files, .3DS files, .3MF files, .AMF files, .X3d files, or any other file formats, and may be generated either by the client device, or by a server-side computer device associated with an online marketplace. At box 560, instructions for simulating the sample of fabric are transmitted to the client device and/or to the automated fabricator, and the process ends. For example, where the instructions are generated by a server-side computer device, the instructions may be downloaded directly to the automated fabricator, or to the client device and subsequently transferred to the automated fabricator. Alternatively, in embodiments where the instructions are generated by the client device, the instructions may be provided to the automated fabricator, e.g., via a wired or a wireless connection.

Figure 6A:
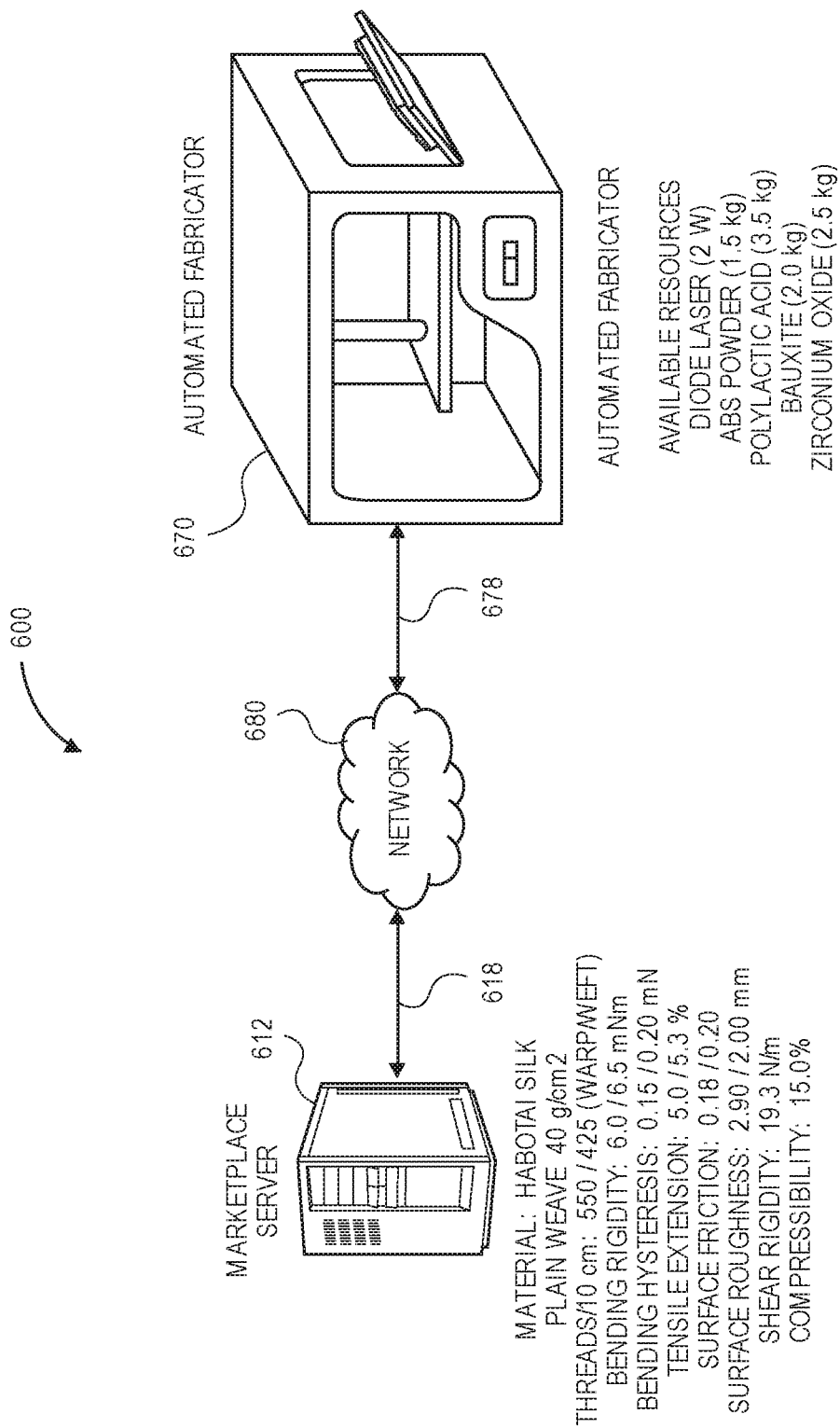
Figure 6C:
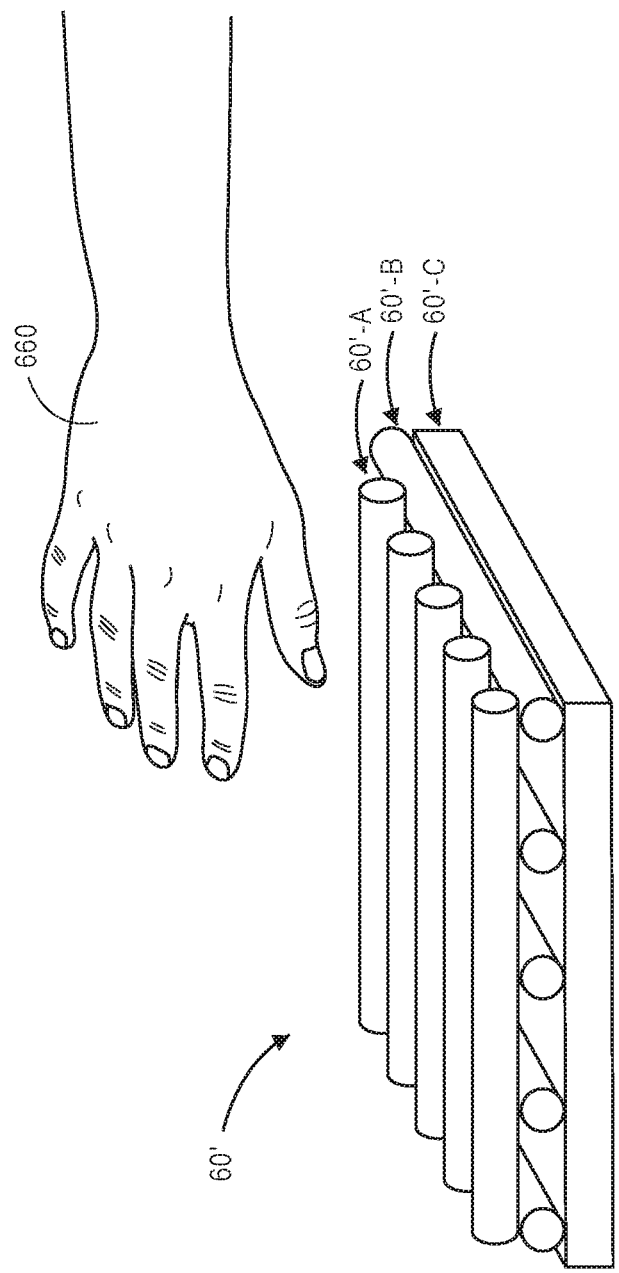

As is discussed above, based on tactile properties representative of a touch and feel of a material of an item that is offered for sale by an online marketplace, instructions for generating a sample that mimics the touch and feel of the item may be provided to an automated fabricator over a network. Referring to FIGS. 6A through 6C, views of aspects of one system 600 for providing tactile or visual feedback in accordance with embodiments of the present disclosure are shown. Except where otherwise noted, reference numerals preceded by the number "6" shown in FIGS. 6A through 6C indicate components or features that are similar to components or features having reference numerals preceded by the number "4" shown in FIGS. 4A and 4B, by the number "2" shown in FIG. 2 or by the number "1" shown in FIGS. 1A through 1F.

As is shown in FIG. 6A, the system 600 includes a marketplace server 612 and an automated fabricator 670 connected to one another over a network 680. The marketplace server 612 includes information or data regarding a material from which the item was formed (e.g., habotai silk) stored thereon, including a type or style of a weave of the material (viz., a plain weave) and a unit weight per unit area (viz., 40 grams per square centimeter). Additionally, the marketplace server 612 also includes information regarding a number of threads per length of the material and values representative of a bending rigidity, a bending hysteresis, a tensile extension, a surface friction and a surface roughness for each of the warp and weft of the material stored thereon. The marketplace server 612 further includes values representative of a shear rigidity and a compressibility of the material stored thereon.

As is also shown in FIG. 6A, the automated fabricator 670 has access to a number of resources including a two-watt diode laser, one and one half kilograms (1.5 kg) of acrylonitrile butadiene styrene powder, three and one half kilograms (3.5 kg) of polylactic acid, two kilograms (2.0 kg) of bauxite and two and one half kilograms (2.5 kg) of zirconium oxide.

In accordance with the present disclosure, instructions for generating a product sample of a fabric may be generated and transmitted, over a network, to an automated fabricator based on tactile properties or other characteristics of a surface of the fabric. The instructions may call for applying any number of materials in a predetermined arrangement or geometry, and with varying specifications, thicknesses or dimensions. For example, as is shown in FIG. 6B, instructions for generating a product sample 60' of the material (e.g., the habotai silk) may include forming a first layer 60'-C of a ten centimeter-by-ten centimeter (10 cm×10 cm) ceramic base having a thickness of one half centimeter (0.5 cm), e.g., from the zirconium oxide powder, a second layer 60'-B of acrylonitrile butadiene styrene strands that are three-quarters of a centimeter (0.75 cm) in diameter and spaced two centimeters (2 cm) on center, and a third layer 60'-A of polylactic acid strands that are one half centimeter (0.5 cm) in diameter and two centimeters (2 cm) on center. In response to such instructions, a filament head 675 may form each of the layers 60'-A, 60'-B, 60'-C in series and atop one another, e.g., by heating the respective materials to a corresponding temperature and applying the materials in specific locations corresponding to a predefined geometry or a construction of the sample 60'.

As is shown in FIG. 6C, the product sample 60' formed from the layers 60'-A, 60'-B, 60'-C may be contacted by a customer 660, who may evaluate the touch and the feel of the fabric without having to purchase the item first, or visit a brick-and-mortar retailer. Where the product sample 60' is formed from recyclable materials, the product sample 60' may be recycled or deconstructed.

Figure 7:
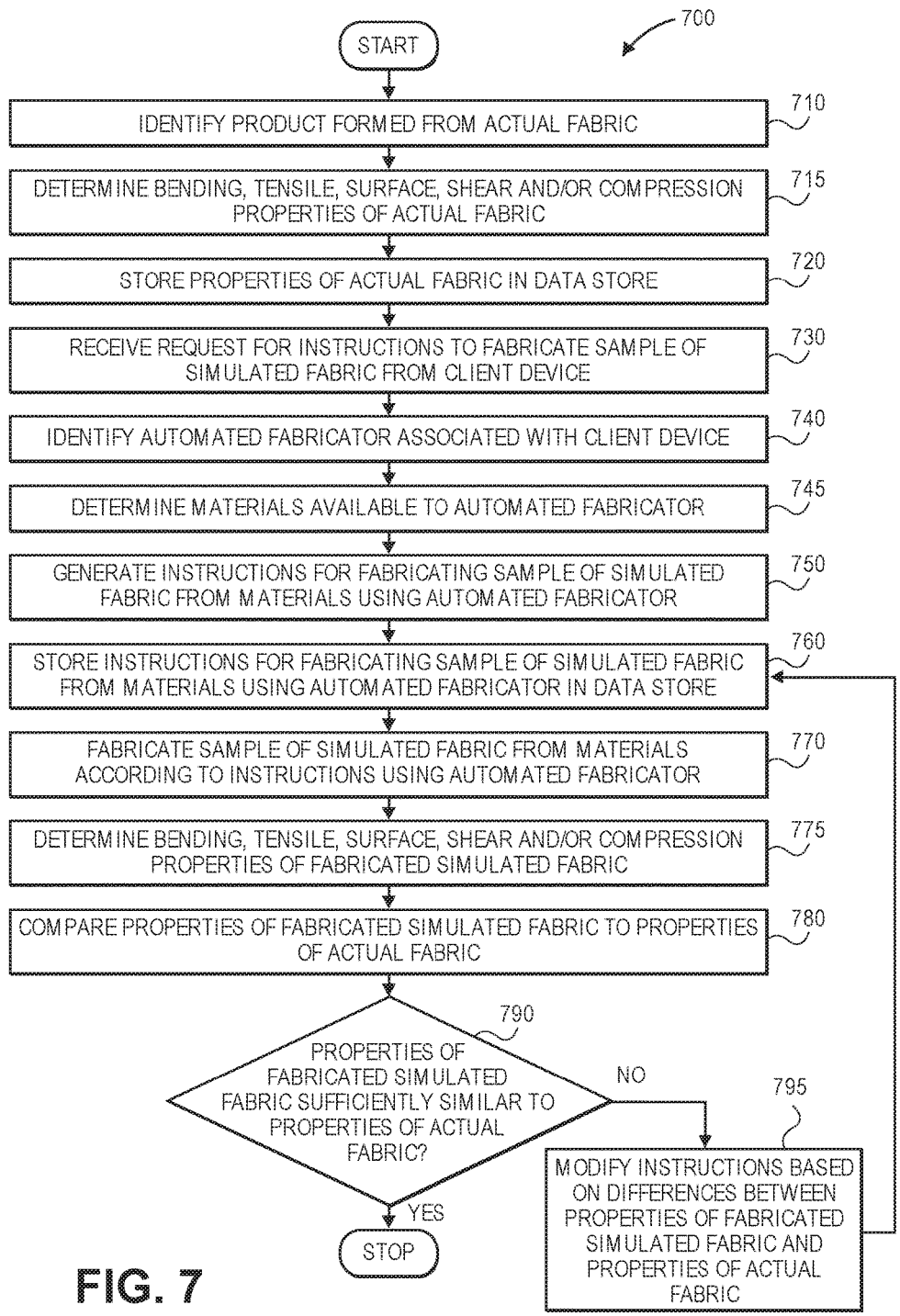
FIG. 7 is a flow chart of one process for providing tactile or visual feedback in accordance with embodiments of the present disclosure.

The product samples of the present disclosure may be formed in any manner, based on the available materials or other resources of an automated fabricator, according to a set of instructions that may be generated and refined on an iterative basis. Referring to FIG. 7, a flow chart 700 representing one process for providing tactile or visual feedback in accordance with embodiments of the present disclosure is shown. At box 710, a product formed from an actual fabric is identified, and at box 715, bending, tensile, surface, shear and/or compression properties of the actual fabric, or other tactile properties, are determined. For example, the actual fabric may be subjected to a battery of tests or evaluations, including tests or evaluations performed using one or more components of the Kawabata Evaluation System, the Fabric Assurance by Simple Testing (FAST) system, or any other testing systems. Alternatively, or additionally, imaging data may be captured from the actual fabric and processed to determine one or more of the properties of the actual fabric. At box 720, the properties of the actual fabric are stored in a data store.

At box 730, a request for instructions to fabricate a sample of simulated fabric is received from a client device. As is discussed above, the request may be received in the form of a selection of a hyperlinked feature on a network page, an electronic message such as an E-mail, text message or any other message, or in any other manner, from a smartphone, a tablet computer, a laptop computer, a desktop computer, or any other networked client device. At box 740, an automated fabricator associated with the client device is identified, and at box 745, materials that are available to the automated fabricator are determined.

At box 750, instructions for fabricating the sample of the simulated fabric from the materials using the automated fabricator are generated. The instructions may be generated locally, e.g., at the client device, or remotely, e.g., on a server at which the request is received, such as a server associated with an online marketplace. Alternatively, the instructions may be generated by one or more processors operating on the automated fabricator itself. At box 760, the instructions for generating the sample of the simulate fabric from the materials available to the automated fabricator are stored in one or more data stores. The data stores may reside on the client device, on a server-side computer device (e.g., a server associated with an online marketplace), on the automated fabricator itself, or in one or more alternate or virtual locations, e.g., in a "cloud"-based environment.

At box 770, a sample of the simulated fabric is fabricated from the materials in accordance with the instructions using the automated fabricator. For example, the instructions may call for molding, shaping, forming, curing, solidifying, depositing or otherwise manipulating one or more of the materials, e.g., in a plurality of layers, to form the sample of the simulated fabric. At box 775, bending, tensile, surface, shear and/or compression properties of the sample of the simulated fabric are determined. For example, after the sample has been formed, the sample may be subjected to one or more of the same tests or evaluations that were performed on the actual fabric, or to one or more other tests or evaluations, in order to determine one or more metrics indicative of the same properties for the sample of the simulated fabric. Alternatively, or additionally, imaging data may be captured from the simulated fabric and processed to determine one or more of the properties of the simulated fabric.

At box 780, the properties of the fabricated simulated fabric are compared to the properties of the actual fabric. At box 790, if the properties of the fabricated simulated fabric are sufficiently similar to the properties of the actual fabric, then the process ends, with the instructions for generating the sample of the simulated fabric from the materials remaining intact. If the properties of the fabricated simulated fabric are not sufficiently similar to the properties of the actual fabric, then the process advances to box 795, where the instructions are modified based on the differences between the properties of the fabricated simulated fabric and the properties of the actual fabric, before returning to box 760, where the modified instructions are stored in the data store or data stores, and to box 770, where another sample of the simulated fabric is fabricated from the available materials according to the modified instructions.

The systems and methods of the present disclosure provide a number of inherent advantages to consumers in electronic commerce. As automated fabricators, such as 3D printers, become more prevalent and commonplace among personal and business consumers, models of a variety of consumer items or other objects may be generated on short notice, and in an ever-widening number of settings. Models of objects that share the same look and feel as those objects may be generated in consumers' homes, businesses or other locations, thereby enabling such consumers to experience a touch and a feel of such objects prior to purchasing them. Some such objects that may be modeled in accordance with the present disclosure include, but are not limited to, trinkets, pendants, bracelets, necklaces, earrings, or other pieces of jewelry; apparel and/or accessories such as shoes, wristwatches, belt buckles, tie clips, socks, hats, scarves, curtains, drapes, towels, rugs, carpets or tiles; or non-apparel items such as vases, furniture, sculptures or silverware.

Moreover, in addition to a touch and a feel, an automated fabricator may be configured to generate a sample of a simulated fabric of an actual object that mimics a look of the actual object. For example, the automated fabricator may be programmed to construct a sample having the same visual perception of a color, a pattern, a gloss, a reflectance, a shine or a matte of the actual object. In some embodiments, instructions for generating a sample may consider any actual or anticipated environmental conditions where the actual object is to be used, and where the sample is to be viewed or otherwise evaluated, including but not limited to conditions such as levels or colors of ambient lighting, positions of users or observers, shadows, occlusions, shine, or atmospheric conditions.

The systems and methods of the present disclosure may be utilized in connection with any number of applications. For example, some embodiments may be utilized in making assessments, selections and purchases of items in electronic commerce, e.g., from one or more online marketplaces. In particular, where an item is formed from fabric, tile, wood, leather or other materials, some embodiments of the present disclosure may generate a sample of the materials from which the item is formed that simulates not only a touch and a feel of the item, but also a look of the item, enabling a customer to assess the item's shape, geometric properties, colors or patterns, at a smaller scale, or in a sample that may be easily manipulated and evaluated.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some embodiments disclosed herein are directed to generating samples having a touch, a feel or a look of items that are offered for sale via an online marketplace, the present disclosure is not so limited. Rather, some of the embodiments disclosed herein may also be used to generate samples simulating the touch, the feel or the look of items that are available from brick-and-mortar retailers, or from any source other than an online marketplace. Moreover, the embodiments of the present disclosure are not limited to generating samples of fabrics from which articles of apparel are formed. Rather, some of the embodiments disclosed herein may be utilized to generate samples mimicking the touch, the feel or the look of any type of item or product.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 7, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale, and do not limit, in any way, the number, type or style of search results that may be ranked in accordance with the present disclosure, or the computer devices, systems or networks by which such results may be provided.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes" are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A networked computing system comprising:
one or more processors; and
one or more memory components having at least a first set of machine-executable instructions configured for execution by the one or more processors to cause the networked computing system to at least:
identify an article of clothing that is offered for sale at an online marketplace, wherein the article of clothing is formed at least in part from a first fabric;
determine at least a first value representative of a tactile feel of the first fabric, wherein the first value comprises at least one of a smoothness, a softness, a stiffness, a roughness, a thickness or a weight of the first fabric;
receive a request for information regarding the article of clothing from a client device;
automatically determine at least one raw material available to an automated fabricator associated with the client device;
generate at least a second set of machine-executable instructions for generating a second fabric using the automated fabricator associated with the client device based at least in part on the first value, wherein at least one of the second set of machine-executable instructions is a first instruction to form a layer of the at least one raw material available to the automated fabricator, and wherein the second fabric comprises the layer of the at least one raw material;
transmit, in response to the request for the information, a network page comprising a link to at least the second set of machine-executable instructions for generating the second fabric by the automated fabricator associated with the client device to the client device;
receive a selection of the link; and
cause the second fabric to be fabricated by the automated fabricator associated with the client device in response to the selection of the link.

2. The networked computer system of claim 1, wherein the first set of machine-executable instructions are further configured for execution by the one or more processors to cause the networked computing system to at least:
determine at least a second value representative of a tactile feel of the second fabric, wherein the second value comprises at least one of a smoothness, a softness, a stiffness, a roughness a thickness or a weight of the second fabric;
determine at least one difference between the first value and the second value; and
update at least the second set of machine-executable instructions based at least in part on the at least one difference; and
store the updated second set of machine-executable instructions in at least the one or more memory components.

3. The networked computer system of claim 1, wherein the first value is determined by a Kawabata Evaluation System or a Fabric Assurance by Simple Testing system.

4. The networked computer system of claim 1, wherein the automated fabricator is a 3D printer connected to at least one of the client device or the networked computer system by at least one of a wireless connection or a wired connection.

5. The networked computer system of claim 1, wherein the at least one raw material comprises at least one of acrylonitrile-butadiene-styrene, nylon, high density polyethylene, polycarbonate, polyetherimide, polyether ether ketone, polylactic acid, poly(meth)acrylate, polyphenylene sulphone, polystyrene, aluminum, antimony, barium, bismuth, cesium, gold, lead, iodine, tantalum, tin or tungsten.

6. A computer-implemented method comprising:
receiving a request for instructions to fabricate a simulated fabric having at least one tactile property of an actual fabric of a product, wherein the request is received from a client device of a customer over a network;
automatically determining at least one material available to an automated fabricator in communication with the client device;
generating a set of instructions to fabricate the simulated fabric by the automated fabricator in communication with the client device based at least in part on the at least one material available to the automated fabricator and the at least one tactile property of the actual fabric, wherein the set of instructions comprises a first instruction to form a first layer of the at least one material by the automated fabricator;
transmitting, in response to the request, at least the set of instructions to fabricate the simulated fabric by the automated fabricator in communication with the client device over the network, wherein the instructions are transmitted to at least one of the client device or the automated fabricator; and
causing the simulated fabric to be fabricated by the automated fabricator in communication with the client device in accordance with the set of instructions.

7. The computer-implemented method of claim 6, further comprising:
prior to generating the set of instructions,
performing at least one testing evolution on the actual fabric of the product, wherein the at least one testing evolution comprises at least one of:
subjecting the actual fabric of the product to bending;
subjecting the actual fabric of the product to tension;
subjecting at least one surface of the actual fabric of the product to friction;
subjecting the actual fabric of the product to shear; or
subjecting the actual fabric of the product to compression;
determining a result of the at least one testing evolution; and
calculating the at least one tactile property of the actual fabric of the product based at least in part on the result of the at least one testing evolution.

8. The computer-implemented method of claim 7, wherein the result of the at least one testing evolution is a deflection of the actual fabric in response to at least one of the bending, the tension, the friction, the shear or the compression.

9. The computer-implemented method of claim 7, wherein the at least one testing evolution is performed using at least one component of a fabric evaluation system.

10. The computer-implemented method of claim 7, further comprising:

after causing the simulated fabric to be fabricated by the automated fabricator in communication with the client device, performing at least one testing evolution on the simulated fabric, wherein the at least one testing evolution comprises at least one of:
subjecting the simulated fabric to bending;
subjecting the simulated fabric to tension;
subjecting at least one surface of the simulated fabric to friction;
subjecting the simulated fabric to shear; or
subjecting the simulated fabric to compression;
determining a result of the at least one testing evolution; and
calculating the at least one tactile property of the simulated fabric based at least in part on the result of the at least one testing evolution;
determining a difference between the at least one tactile property of the simulated fabric to the at least one tactile property of the actual fabric;
updating the set of instructions based at least in part on the difference; and
storing the updated set of instructions in at least one data store.

11. The computer-implemented method of claim 6, wherein the at least one tactile property of the actual product is at least one of a bending rigidity, a bending hysteresis, a tensile energy, a tensile resilience, a tensile strain, a surface roughness, a coefficient of static friction, a shearing rigidity, a shear hysteresis, a compressional energy, a compressional resilience, a compression rate, a fabric thickness or a fabric weight per unit area.

12. The computer-implemented method of claim 6, further comprising:
identifying at least one attribute of the automated fabricator,
wherein the instructions are generated based at least in part on the at least one tactile property of the actual fabric, the at least one attribute of the automated fabricator and the at least one material available to the automated fabricator.

13. The computer-implemented method of claim 6, wherein a plurality of materials are available to the automated fabricator,
wherein the plurality of materials includes the at least one material, and
wherein generating the set of instructions further comprises:
determining the first instruction for depositing the first layer of a first one of the plurality of materials available to the automated fabricator; and
determining a second instruction for depositing a second layer of a second one of the plurality of materials available to the automated fabricator,
wherein the set of instructions comprises the first instruction and the second instruction.

14. The computer-implemented method of claim 6, further comprising:
capturing at least one image of the actual fabric of the product;
determining the at least one tactile property of the actual fabric of the product based at least in part on the at least one image of the actual fabric of the product.

15. The computer-implemented method of claim 6, wherein the automated fabricator is a 3D printer connected to at least one of the client device or the network by at least one of a wireless connection or a wired connection.

16. The computer-implemented method of claim 6, wherein the at least one material comprises at least one of acrylonitrile-butadiene-styrene, nylon, high density polyethylene, polycarbonate, polyetherimide, polyether ether ketone, polylactic acid, poly(meth)acrylate, polyphenylene sulphone, polystyrene, aluminum, antimony, barium, bismuth, cesium, gold, lead, iodine, tantalum, tin or tungsten.

17. The computer-implemented method of claim 6, further comprising:
receiving a selection of an interactive feature associated with the actual product by the customer over the network, wherein the interactive feature is displayed on one of a first page associated with an online marketplace rendered in a browser operating on the client device or a second page of a shopping application operating on the client device;
determining information regarding the actual product in response to the selection, wherein the information comprises an identifier of the actual fabric of the product; and
generating a data file comprising the set of instructions based at least in part on the information regarding the actual product.

18. The computer-implemented method of claim 17, wherein the data file comprising the instructions is at least one of an .STL file, an .OBJ file, a .3DS file, a .3MF file, an .AMF file or an .X3D file.

19. An electronic commerce system comprising:
a plurality of computer processors,
wherein at least one of the computer processors is configured to at least:
identify a product to be offered for sale via the electronic commerce system, wherein the product comprises at least one surface configured to contact human skin during use of the product;
determine at least one tactile property for the at least one surface of the product;
store information regarding the product in at least one data store, wherein the information regarding the product comprises the at least one tactile property;
receive a selection of the product from a client device;
identify a 3D printer associated with the client device;
automatically determine a plurality of raw materials available to the 3D printer;
generate instructions for fabricating a sample of the at least one surface of the product having the at least one tactile property by the 3D printer based at least in part on the at least one tactile property and the plurality of raw materials available to the 3D printer; and
transmit, over the network in response to the selection of the product, a network page comprising a link to at least the instructions for fabricating the sample of the at least one surface of the product having the at least one tactile property by the 3D printer.

20. The electronic commerce system of claim 19, wherein the plurality of raw materials comprises at least one of acrylonitrile-butadiene-styrene, nylon, high density polyethylene, polycarbonate, polyetherimide, polyether ether ketone, polylactic acid, poly(meth)acrylate, polyphenylene sulphone, polystyrene, aluminum, antimony, barium, bismuth, cesium, gold, lead, iodine, tantalum, tin or tungsten.

* * * * *